United States Patent
Nelson et al.

(10) Patent No.: US 9,381,810 B2
(45) Date of Patent: Jul. 5, 2016

(54) ELECTRONIC THROTTLE CONTROL

(75) Inventors: Stephen L Nelson, Osceola, WI (US);
Karl J Grajkowski, Hudson, WI (US);
Scott P Sandstrom, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 1348 days.

(21) Appl. No.: 13/153,037

(22) Filed: Jun. 3, 2011

(65) Prior Publication Data

US 2011/0301824 A1 Dec. 8, 2011

Related U.S. Application Data

(60) Provisional application No. 61/396,817, filed on Jun. 3, 2010.

(51) Int. Cl.
| | |
|---|---|
| *B60K 28/00* | (2006.01) |
| *B60K 28/10* | (2006.01) |
| *B60K 31/00* | (2006.01) |
| *B60W 10/06* | (2006.01) |
| *F02D 41/02* | (2006.01) |
| *B60K 26/04* | (2006.01) |
| *B60W 10/101* | (2012.01) |

(Continued)

(52) U.S. Cl.
CPC ............... *B60K 31/00* (2013.01); *B60K 26/04* (2013.01); *B60K 28/10* (2013.01); *B60W 10/06* (2013.01); *F02D 41/021* (2013.01); *B60K 2031/0091* (2013.01); *B60W 10/101* (2013.01); *B60W 50/082* (2013.01); *B60Y 2200/124* (2013.01); *F02D 41/102* (2013.01); *F02D 41/2422* (2013.01); *F02D 2200/604* (2013.01); *G01C 21/20* (2013.01)

(58) Field of Classification Search
CPC ........ B60K 28/00; B60K 28/10; B60K 31/00; B60W 10/06; F02D 41/021
USPC .................. 180/170, 187, 271; 701/102, 103
See application file for complete search history.

(56) References Cited

U.S. PATENT DOCUMENTS

| | | | |
|---|---|---|---|
| 3,013,442 A | 12/1961 | Fox et al. | |
| 3,623,565 A | 11/1971 | Ward et al. | |

(Continued)

FOREIGN PATENT DOCUMENTS

| | | | |
|---|---|---|---|
| DE | 4328551 A1 | * | 3/1994 |
| EP | 0953470 | | 11/1999 |

(Continued)

OTHER PUBLICATIONS

Written Opinion of the International Searching Authority issued by the European Patent Office, dated as of the International Search Report, Sep. 2, 2011, for International Application No. PCT/US2011/039165; 8 pages.

(Continued)

*Primary Examiner* — Joseph Rocca
*Assistant Examiner* — Maurice Williams
(74) *Attorney, Agent, or Firm* — Faegre Baker Daniels LLP

(57) ABSTRACT

An electronic throttle control (ETC) system is disclosed for use on a recreational or a utility vehicle. The ETC system includes a drive mode selection device for selecting between a plurality of drive modes. The ETC system provides an adjustable engine idle speed and an engine power limiting feature.

17 Claims, 8 Drawing Sheets

(51) Int. Cl.
  *B60W 50/08* (2012.01)
  *F02D 41/10* (2006.01)
  *F02D 41/24* (2006.01)
  *G01C 21/20* (2006.01)

(56) References Cited

U.S. PATENT DOCUMENTS

| | | | |
|---|---|---|---|
| 3,737,001 A * | 6/1973 | Rasenberger | B62D 55/04 |
| | | | 180/185 |
| 3,760,246 A * | 9/1973 | Gurwicz et al. | 318/52 |
| 3,952,829 A | 4/1976 | Gray | |
| 3,982,446 A | 9/1976 | Van Dyken | |
| 4,075,841 A | 2/1978 | Hamma et al. | |
| 4,112,885 A | 9/1978 | Iwata et al. | |
| 4,116,006 A | 9/1978 | Wallis | |
| 4,327,948 A * | 5/1982 | Beck et al. | 303/194 |
| 4,340,126 A * | 7/1982 | Larson | 180/305 |
| 4,453,516 A | 6/1984 | Filsinger | |
| 4,508,078 A | 4/1985 | Takeuchi et al. | |
| 4,580,537 A | 4/1986 | Uchiyama | |
| 4,620,602 A * | 11/1986 | Capriotti | B62D 55/04 |
| | | | 180/9.21 |
| 4,658,662 A | 4/1987 | Rundle | |
| 4,671,235 A | 6/1987 | Hosaka | |
| 4,688,533 A | 8/1987 | Otobe | |
| 4,691,676 A | 9/1987 | Kikuchi | |
| 4,691,677 A | 9/1987 | Hotate et al. | |
| 4,759,329 A | 7/1988 | Nobuo et al. | |
| 4,765,296 A | 8/1988 | Ishikawa et al. | |
| 4,781,162 A | 11/1988 | Ishikawa et al. | |
| 4,785,782 A | 11/1988 | Tanaka et al. | |
| 4,787,353 A | 11/1988 | Ishikawa et al. | |
| 4,809,179 A * | 2/1989 | Klinger et al. | 701/37 |
| 4,809,659 A | 3/1989 | Tamaki et al. | |
| 4,817,466 A | 4/1989 | Kawamura | |
| 4,831,533 A | 5/1989 | Skoldheden | |
| 4,838,780 A | 6/1989 | Yamagata | |
| 4,856,477 A | 8/1989 | Hanaoka et al. | |
| 4,860,708 A | 8/1989 | Yamaguchi et al. | |
| 4,862,854 A | 9/1989 | Oda et al. | |
| 4,881,428 A | 11/1989 | Ishikawa et al. | |
| 4,893,501 A | 1/1990 | Sogawa | |
| 4,895,343 A | 1/1990 | Sato | |
| 4,898,137 A | 2/1990 | Fujita et al. | |
| 4,898,138 A | 2/1990 | Nishimura et al. | |
| 4,901,695 A | 2/1990 | Kabasin et al. | |
| 4,905,783 A * | 3/1990 | Bober | 180/422 |
| 4,913,006 A | 4/1990 | Tsuyama et al. | |
| 4,919,097 A | 4/1990 | Mitui et al. | |
| 4,926,636 A | 5/1990 | Tadokoro et al. | |
| 4,966,247 A | 10/1990 | Masuda | |
| 4,969,695 A | 11/1990 | Maehata | |
| 5,002,028 A | 3/1991 | Arai et al. | |
| 5,002,148 A | 3/1991 | Miyake et al. | |
| 5,018,408 A | 5/1991 | Bota et al. | |
| 5,033,328 A | 7/1991 | Shimanaka | |
| 5,036,939 A | 8/1991 | Johnson et al. | |
| 5,040,114 A | 8/1991 | Ishikawa et al. | |
| 5,060,744 A | 10/1991 | Katoh et al. | |
| 5,076,385 A | 12/1991 | Terazawa et al. | |
| 5,078,109 A | 1/1992 | Yoshida et al. | |
| 5,088,464 A | 2/1992 | Meaney | |
| 5,092,298 A | 3/1992 | Suzuki et al. | |
| 5,113,821 A | 5/1992 | Fukui | |
| 5,129,475 A | 7/1992 | Kawano et al. | |
| 5,150,635 A | 9/1992 | Minowa et al. | |
| 5,170,343 A | 12/1992 | Matsuda | |
| 5,174,263 A | 12/1992 | Meaney | |
| 5,218,540 A | 6/1993 | Ishikawa et al. | |
| 5,233,530 A | 8/1993 | Shimada et al. | |
| 5,265,693 A * | 11/1993 | Rees et al. | 180/197 |
| 5,307,777 A | 5/1994 | Sasajima et al. | |
| 5,314,362 A | 5/1994 | Nagahora | |
| 5,315,295 A | 5/1994 | Fujii | |
| 5,337,239 A | 8/1994 | Okuda | |
| 5,343,396 A | 8/1994 | Youngblood | |
| 5,391,127 A | 2/1995 | Nishimura | |
| RE34,906 E | 4/1995 | Tamaki et al. | |
| 5,406,920 A | 4/1995 | Murata et al. | |
| 5,413,540 A | 5/1995 | Streib et al. | |
| 5,443,558 A | 8/1995 | Ibaraki et al. | |
| 5,467,751 A | 11/1995 | Kumagai | |
| 5,490,487 A | 2/1996 | Kato et al. | |
| 5,514,049 A | 5/1996 | Kamio et al. | |
| 5,521,825 A | 5/1996 | Unuvar et al. | |
| 5,524,724 A | 6/1996 | Nishigaki et al. | |
| 5,555,499 A * | 9/1996 | Yamashita et al. | 701/84 |
| 5,575,737 A | 11/1996 | Weiss | |
| 5,611,309 A | 3/1997 | Kumagai et al. | |
| 5,645,033 A | 7/1997 | Person et al. | |
| 5,713,428 A | 2/1998 | Linden | |
| 5,774,820 A | 6/1998 | Linden | |
| 5,845,726 A | 12/1998 | Kikkawa et al. | |
| 5,890,870 A | 4/1999 | Berger et al. | |
| 5,897,287 A | 4/1999 | Berger et al. | |
| 5,922,038 A | 7/1999 | Horiuchi | |
| 5,938,556 A * | 8/1999 | Lowell | 475/89 |
| 5,957,992 A | 9/1999 | Kiyono | |
| 6,002,975 A * | 12/1999 | Schiffmann et al. | 701/36 |
| 6,016,795 A | 1/2000 | Ohki | |
| 6,019,085 A | 2/2000 | Sato et al. | |
| 6,038,500 A | 3/2000 | Weiss | |
| 6,073,072 A | 6/2000 | Ishii | |
| 6,073,074 A | 6/2000 | Saito et al. | |
| 6,086,510 A | 7/2000 | Kadota | |
| 6,094,614 A * | 7/2000 | Hiwatashi | 701/89 |
| 6,134,499 A | 10/2000 | Goode et al. | |
| 6,138,069 A | 10/2000 | Ellertson et al. | |
| 6,167,341 A | 12/2000 | Gourmelen et al. | |
| 6,170,923 B1 | 1/2001 | Iguchi | |
| 6,178,371 B1 | 1/2001 | Light et al. | |
| 6,192,305 B1 * | 2/2001 | Schiffmann | 701/45 |
| 6,217,480 B1 | 4/2001 | Iwata et al. | |
| 6,226,389 B1 | 5/2001 | Lemelson et al. | |
| 6,240,365 B1 | 5/2001 | Bunn | |
| 6,244,986 B1 | 6/2001 | Mori et al. | |
| 6,263,858 B1 | 7/2001 | Pursifull et al. | |
| 6,275,763 B1 * | 8/2001 | Lotito et al. | 701/71 |
| 6,288,534 B1 | 9/2001 | Starkweather et al. | |
| 6,318,337 B1 | 11/2001 | Pursifull | |
| 6,318,490 B1 | 11/2001 | Laning | |
| 6,351,704 B1 | 2/2002 | Koerner | |
| 6,370,472 B1 | 4/2002 | Fosseen | |
| 6,371,884 B1 | 4/2002 | Channing | |
| 6,379,114 B1 | 4/2002 | Schott et al. | |
| 6,456,908 B1 | 9/2002 | Kumar | |
| 6,470,852 B1 | 10/2002 | Kanno | |
| 6,483,201 B1 * | 11/2002 | Klarer | B60K 28/10 |
| | | | 307/10.1 |
| 6,485,340 B1 | 11/2002 | Kolb et al. | |
| 6,488,609 B1 | 12/2002 | Morimoto et al. | |
| 6,513,611 B2 | 2/2003 | Ito et al. | |
| 6,551,153 B1 | 4/2003 | Hattori | |
| 6,581,710 B2 | 6/2003 | Sprinkle et al. | |
| 6,644,318 B1 | 11/2003 | Adams et al. | |
| 6,647,328 B2 | 11/2003 | Walker | |
| 6,655,233 B2 | 12/2003 | Evans et al. | |
| 6,657,539 B2 | 12/2003 | Yamamoto | |
| 6,675,577 B2 | 1/2004 | Evans | |
| 6,699,085 B2 | 3/2004 | Hattori | |
| 6,704,643 B1 | 3/2004 | Suhre et al. | |
| 6,738,708 B2 | 5/2004 | Suzuki et al. | |
| 6,757,606 B1 | 6/2004 | Gonring | |
| 6,761,145 B2 | 7/2004 | Matsuda et al. | |
| 6,772,061 B1 | 8/2004 | Berthiaume et al. | |
| 6,795,764 B2 | 9/2004 | Schmitz et al. | |
| 6,820,712 B2 | 11/2004 | Nakamura | |
| 6,845,314 B2 | 1/2005 | Fosseen | |
| 6,845,829 B2 | 1/2005 | Hafendorfer | |
| 6,848,420 B2 | 2/2005 | Ishiguro et al. | |
| 6,848,956 B2 | 2/2005 | Ozawa | |

(56) References Cited

U.S. PATENT DOCUMENTS

| | | | |
|---|---|---|---|
| 6,851,495 B2 | 2/2005 | Sprinkle et al. | |
| 6,874,467 B2 | 4/2005 | Hunt et al. | |
| 6,886,529 B2 | 5/2005 | Suzuki et al. | |
| 6,887,182 B2 | 5/2005 | Nakatani et al. | |
| 6,889,654 B2 | 5/2005 | Ito | |
| 6,897,629 B2 | 5/2005 | Wilton et al. | |
| 6,941,209 B2 | 9/2005 | Liu | |
| 6,964,259 B1 | 11/2005 | Raetzman | |
| 6,964,260 B2 | 11/2005 | Samoto et al. | |
| 6,990,401 B2 | 1/2006 | Neiss et al. | |
| 7,036,485 B1 | 5/2006 | Koerner | |
| 7,044,260 B2 | 5/2006 | Schaedler | |
| 7,055,497 B2 | 6/2006 | Maehara et al. | |
| 7,058,490 B2 | 6/2006 | Kihm | |
| 7,066,142 B2 | 6/2006 | Hanasato | |
| 7,077,713 B2 | 7/2006 | Watabe et al. | |
| 7,086,379 B2 | 8/2006 | Blomenberg et al. | |
| 7,096,851 B2 | 8/2006 | Matsuda et al. | |
| 7,163,000 B2 | 1/2007 | Ishida et al. | |
| 7,171,945 B2 | 2/2007 | Matsuda et al. | |
| 7,171,947 B2 | 2/2007 | Fukushima et al. | |
| 7,182,063 B2 | 2/2007 | Keefover et al. | |
| 7,184,873 B1 | 2/2007 | Idsinga | |
| 7,185,630 B2 | 3/2007 | Takahashi et al. | |
| 7,220,153 B2 | 5/2007 | Okuyama | |
| 7,235,963 B2 | 6/2007 | Wayama | |
| 7,249,986 B2 | 7/2007 | Otobe et al. | |
| 7,259,357 B2 | 8/2007 | Walker | |
| 7,260,319 B2 | 8/2007 | Watanabe et al. | |
| 7,260,471 B2 | 8/2007 | Matsuda et al. | |
| 7,280,904 B2 | 10/2007 | Kaji | |
| 7,287,511 B2 | 10/2007 | Matsuda | |
| 7,305,295 B2 | 12/2007 | Bauerle et al. | |
| 7,311,082 B2 | 12/2007 | Yokoi | |
| 7,315,779 B1 | 1/2008 | Rioux et al. | |
| 7,318,410 B2 | 1/2008 | Yokoi | |
| 7,325,533 B2 | 2/2008 | Matsuda | |
| 7,331,326 B2 | 2/2008 | Arai et al. | |
| 7,354,321 B2 | 4/2008 | Takada et al. | |
| 7,367,247 B2 | 5/2008 | Horiuchi et al. | |
| 7,367,316 B2 | 5/2008 | Russell et al. | |
| 7,367,854 B2 | 5/2008 | Arvidsson | |
| 7,380,538 B1 | 6/2008 | Gagnon | |
| 7,399,210 B2 | 7/2008 | Yoshimasa | |
| 7,416,458 B2 | 8/2008 | Suemori et al. | |
| 7,422,495 B2 | 9/2008 | Kinoshita | |
| 7,431,013 B2 | 10/2008 | Hotta et al. | |
| 7,433,774 B2 | 10/2008 | Sen et al. | |
| 7,445,071 B2 | 11/2008 | Yamazaki | |
| 7,454,282 B2* | 11/2008 | Mizuguchi | 701/102 |
| 7,454,284 B2 | 11/2008 | Fosseen | |
| 7,458,360 B2 | 12/2008 | Irihune et al. | |
| 7,461,630 B2 | 12/2008 | Maruo | |
| 7,475,746 B2 | 1/2009 | Tsukada | |
| 7,478,689 B1 | 1/2009 | Sugden et al. | |
| 7,486,199 B2 | 2/2009 | Tengler et al. | |
| 7,505,836 B2 | 3/2009 | Okuyama et al. | |
| 7,506,633 B2 | 3/2009 | Cowan | |
| 7,530,345 B1 | 5/2009 | Plante et al. | |
| 7,571,073 B2 | 8/2009 | Gamberini et al. | |
| 7,598,849 B2 | 10/2009 | Gallant et al. | |
| 7,647,143 B2 | 1/2010 | Ito et al. | |
| 7,771,313 B2 | 8/2010 | Cullen et al. | |
| 7,822,514 B1 | 10/2010 | Erickson | |
| 7,826,959 B2 | 11/2010 | Namari et al. | |
| 8,204,666 B2 | 6/2012 | Takeuchi et al. | |
| 8,359,149 B2 | 1/2013 | Shin | |
| 8,534,397 B2 | 9/2013 | Grajkowski et al. | |
| 2002/0115357 A1 | 8/2002 | Hiki et al. | |
| 2003/0014174 A1 | 1/2003 | Giers | |
| 2003/0062025 A1 | 4/2003 | Samoto et al. | |
| 2004/0015275 A1 | 1/2004 | Herzog et al. | |
| 2004/0024515 A1* | 2/2004 | Troupe et al. | 701/93 |
| 2004/0026880 A1* | 2/2004 | Bundy | 280/6.159 |
| 2004/0216550 A1 | 11/2004 | Fallak et al. | |
| 2004/0226538 A1 | 11/2004 | Cannone et al. | |
| 2004/0245034 A1 | 12/2004 | Miyamoto et al. | |
| 2005/0004736 A1 | 1/2005 | Belcher et al. | |
| 2005/0045148 A1 | 3/2005 | Katsuragawa et al. | |
| 2005/0133006 A1* | 6/2005 | Frenz et al. | 123/399 |
| 2005/0149246 A1 | 7/2005 | McLeod | |
| 2005/0155571 A1 | 7/2005 | Hanasato | |
| 2005/0217953 A1* | 10/2005 | Bossard | 188/281 |
| 2005/0284446 A1 | 12/2005 | Okuyama | |
| 2006/0014606 A1 | 1/2006 | Sporl | |
| 2006/0018636 A1 | 1/2006 | Watanabe et al. | |
| 2006/0065239 A1 | 3/2006 | Tsukada et al. | |
| 2006/0112930 A1 | 6/2006 | Matsuda et al. | |
| 2006/0162681 A1 | 7/2006 | Kawasaki | |
| 2006/0235602 A1 | 10/2006 | Ishida et al. | |
| 2006/0243246 A1 | 11/2006 | Yokoi | |
| 2006/0243247 A1 | 11/2006 | Yokoi | |
| 2006/0247840 A1 | 11/2006 | Matsuda et al. | |
| 2006/0270520 A1 | 11/2006 | Owens | |
| 2007/0039770 A1* | 2/2007 | Barrette et al. | 180/197 |
| 2007/0045028 A1* | 3/2007 | Yamamoto et al. | 180/282 |
| 2007/0050125 A1 | 3/2007 | Matsuda et al. | |
| 2007/0068490 A1 | 3/2007 | Matsuda | |
| 2007/0118268 A1 | 5/2007 | Inoue et al. | |
| 2007/0119419 A1 | 5/2007 | Matsuda | |
| 2007/0142167 A1 | 6/2007 | Kanafani | |
| 2007/0151544 A1 | 7/2007 | Arai et al. | |
| 2007/0169744 A1 | 7/2007 | Maruo et al. | |
| 2007/0178779 A1 | 8/2007 | Takada et al. | |
| 2007/0192001 A1 | 8/2007 | Tatsumi et al. | |
| 2007/0213920 A1 | 9/2007 | Igarashi et al. | |
| 2007/0240917 A1* | 10/2007 | Duceppe | B62D 15/00 180/9.21 |
| 2007/0244619 A1 | 10/2007 | Peterson | |
| 2007/0246010 A1 | 10/2007 | Okuyama et al. | |
| 2007/0247291 A1 | 10/2007 | Masuda et al. | |
| 2007/0255462 A1 | 11/2007 | Masuda et al. | |
| 2007/0271026 A1 | 11/2007 | Hijikata | |
| 2008/0015767 A1 | 1/2008 | Masuda et al. | |
| 2008/0022969 A1* | 1/2008 | Frenz et al. | 123/347 |
| 2008/0078355 A1 | 4/2008 | Maehara et al. | |
| 2008/0091309 A1 | 4/2008 | Walker | |
| 2008/0114521 A1 | 5/2008 | Doering | |
| 2008/0115761 A1 | 5/2008 | Deguchi et al. | |
| 2008/0178838 A1 | 7/2008 | Ota | |
| 2008/0178839 A1 | 7/2008 | Oshima et al. | |
| 2008/0178840 A1 | 7/2008 | Oshima et al. | |
| 2008/0287256 A1 | 11/2008 | Unno | |
| 2008/0300768 A1 | 12/2008 | Hijikata | |
| 2009/0071437 A1 | 3/2009 | Samoto et al. | |
| 2009/0076699 A1* | 3/2009 | Osaki et al. | 701/78 |
| 2009/0095252 A1 | 4/2009 | Yamada | |
| 2009/0095254 A1 | 4/2009 | Yamada | |
| 2009/0096598 A1 | 4/2009 | Tengler et al. | |
| 2009/0132154 A1 | 5/2009 | Fuwa et al. | |
| 2009/0171546 A1 | 7/2009 | Tozuka et al. | |
| 2009/0173562 A1 | 7/2009 | Namari et al. | |
| 2009/0229568 A1 | 9/2009 | Nakagawa | |
| 2009/0287392 A1 | 11/2009 | Thomas | |
| 2009/0312147 A1 | 12/2009 | Oshima et al. | |
| 2010/0012399 A1* | 1/2010 | Hansen | B62D 55/04 180/9.26 |
| 2010/0016120 A1 | 1/2010 | Dickinson et al. | |
| 2010/0017070 A1* | 1/2010 | Doering et al. | 701/48 |
| 2010/0138142 A1 | 6/2010 | Pease | |
| 2010/0140009 A1* | 6/2010 | Kamen et al. | 180/282 |
| 2010/0145595 A1 | 6/2010 | Bellistri et al. | |
| 2010/0181416 A1 | 7/2010 | Sakamoto et al. | |
| 2010/0203933 A1* | 8/2010 | Eyzaguirre et al. | 463/2 |
| 2010/0219004 A1* | 9/2010 | Mackenzie | B62D 55/04 180/9.21 |
| 2010/0282210 A1 | 11/2010 | Itagaki | |
| 2011/0036656 A1* | 2/2011 | Nicoson | 180/220 |
| 2011/0190972 A1 | 8/2011 | Timmons et al. | |

(56) References Cited

U.S. PATENT DOCUMENTS

| | | | |
|---|---|---|---|
| 2011/0270509 A1* | 11/2011 | Whitney et al. | 701/103 |
| 2011/0307155 A1* | 12/2011 | Simard | 701/93 |
| 2012/0065860 A1* | 3/2012 | Isaji et al. | 701/70 |

FOREIGN PATENT DOCUMENTS

| | | | |
|---|---|---|---|
| GB | 2412448 A | 9/2005 | |
| GB | 2445291 A | 7/2008 | |
| JP | 08332940 A * | 12/1996 | B60T 8/58 |
| JP | 2003328806 A | 11/2003 | |
| WO | WO9727388 | 7/1997 | |
| WO | WO2004009433 | 1/2004 | |
| WO | WO 2009008816 A1 | 1/2009 | |

OTHER PUBLICATIONS

International Preliminary Report on Patentability issued by The International Bureau of WIPO, Dec. 4, 2012, for International Application No. PCT/US2011/039165; 9 pages.

Trebi-Ollennu et al., Adaptive Fuzzy Throttle Control of an All Terrain Vehicle, 2001, Abstract.

McKay et al., Delphi Electronic Throttle Control Systems for Model Year 2000; Driver Features, System Security, and OEM Benefits. ETC for the Mass Market, Electronic Engine Controls 2000: Controls (SP-1500), SAE 2000 World Congress, Detroit, MI, Mar. 6-9, 2000, 13 pages.

International Search Report of the International Searching Authority for Application No. PCT/US2011/39165, mailed Jan. 3, 2012, 7 pgs.

* cited by examiner

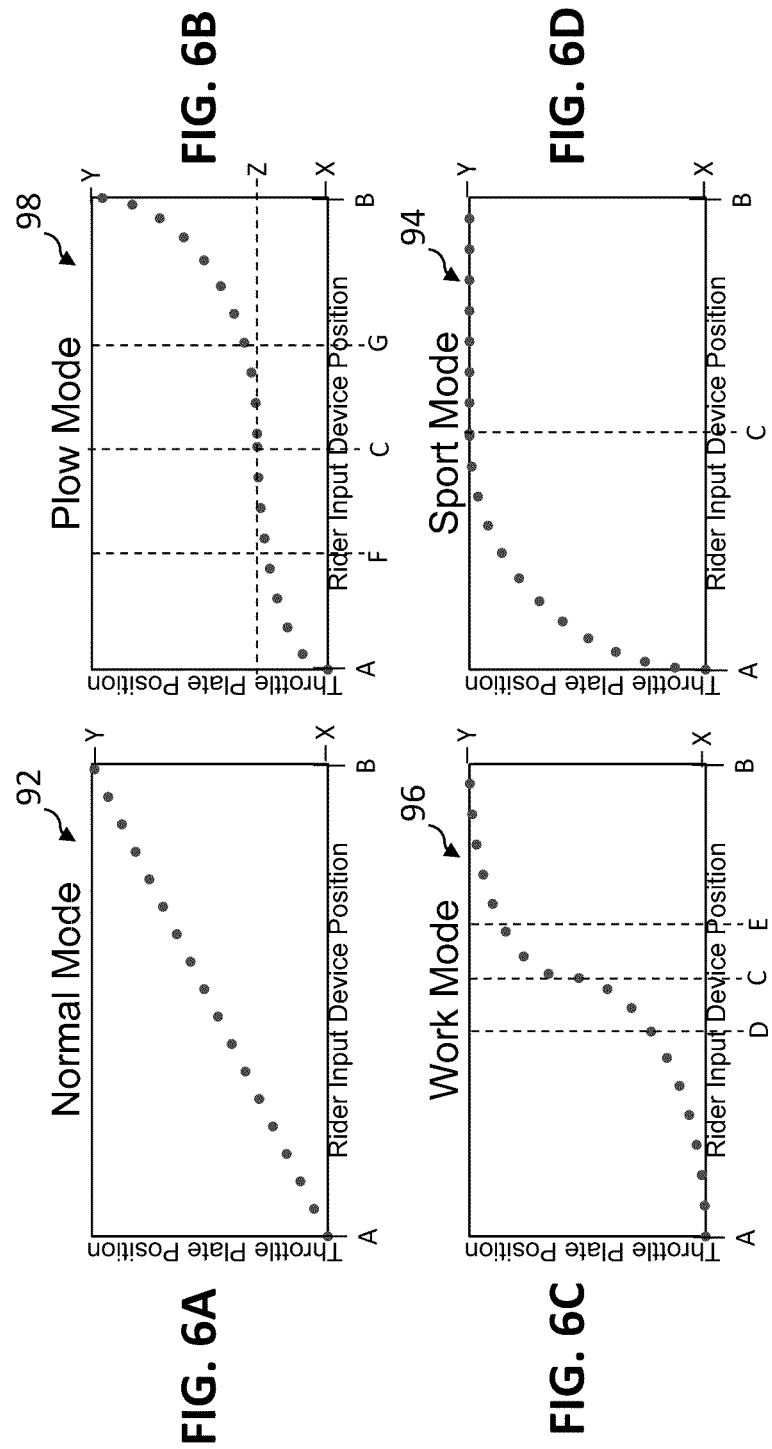

ELECTRONIC THROTTLE CONTROL

RELATED APPLICATION

This application claims the benefit of U.S. Provisional Patent Application No. 61/396,817, filed Jun. 3, 2010, the disclosure of which is expressly incorporated by reference herein.

FIELD OF THE DISCLOSURE

The present disclosure relates to electronic throttle control, and more particularly to an electronic throttle control system for recreational and utility vehicles.

BACKGROUND AND SUMMARY

In recreational vehicles such as all-terrain vehicles (ATV's), utility vehicles, motorcycles, etc., a mechanical assembly is typically used for controlling the operation of the throttle valve. While many automotive applications utilize electronic throttle control for controlling throttle plate movement, on- and off-road recreational vehicles often link the throttle operator (e.g. thumb lever, twist grip, or foot pedal) directly to the throttle valve via a mechanical linkage such as a cable. As such, separate mechanical devices are necessary for controlling engine idle speed, limiting vehicle speed and power, and setting cruise control.

Recreational vehicles are used for various applications such as navigating trails, pulling loads, plowing, hauling, spraying, mowing, etc. With mechanically controlled throttle valves, the throttle response is often jumpy or hard to control for applications such as plowing or hauling. The throttle valve may open too quickly or too slowly in response to corresponding movement of the throttle operator, resulting in an undesirable torque output at various positions of the throttle operator. In mechanically controlled throttle valves, manually adjusting the rate the throttle valve opens in response to movement of the throttle operator is cumbersome and/or impracticable.

In one exemplary embodiment of the present disclosure, a recreational vehicle is provided including a chassis, a ground engaging mechanism configured to support the chassis, and an engine supported by the chassis. A throttle valve is configured to regulate air intake into the engine, and an engine control module is configured to control the throttle valve. An operator input device is in communication with the engine control module for controlling a position of the throttle valve. A drive mode selection device in communication with the engine control module selects one of a plurality of drive modes, and the plurality of drive modes provide variable movement of the throttle valve in response to a movement of the operator input device.

In another exemplary embodiment of the present disclosure, a recreational vehicle is provided including a chassis, a ground engaging mechanism configured to support the chassis, and an engine supported by the chassis. A throttle valve is configured to regulate air intake into the engine, and an engine control module is configured to control the throttle valve. An operator input device is in communication with the engine control module, and the engine control module controls an opening of the throttle valve based on the operator input device. An idle speed control device in communication with the engine control module selects an idle speed of the engine and provides a signal representative of the selected idle speed to the engine control module. The engine control module controls the throttle valve to substantially hold the engine at the selected idle speed.

In yet another exemplary embodiment of the present disclosure, a recreational vehicle is provided including a chassis, a ground engaging mechanism configured to support the chassis, and an engine supported by the chassis. A throttle valve is configured to regulate engine power, and an engine control module is configured to control the throttle valve. A throttle input device is in communication with the engine control module. A location detection device in communication with the engine control module is configured to detect a location of the vehicle. The location detection device is configured to provide a signal to the engine control module representative of the detected location of the vehicle, and the engine control module automatically controls the throttle valve to limit the vehicle speed based on the detected location of the vehicle.

In still another exemplary embodiment of the present disclosure, a recreational vehicle is provided including a chassis, a ground engaging mechanism configured to support the chassis, and an engine supported by the chassis. A throttle valve is configured to regulate engine power, and a user interface is configured to receive a security code. An engine control module in communication with the user interface is configured to control the throttle valve, and the engine control module is configured to receive the security code from the user interface. A location detection device in communication with the engine control module is configured to detect a location of the vehicle. The engine control module automatically limits a torque output of the engine upon the security code being received at the engine control module and upon the detected location of the vehicle being outside a predetermined area.

In another exemplary embodiment of the present disclosure, an electronic throttle control method is provided for a vehicle. The method includes the step of providing an engine, a throttle valve configured to control a torque output of the engine, and an engine control module configured to control the throttle valve. The method further includes monitoring at least one of a vehicle speed and an engine speed and receiving a request associated with a maximum vehicle speed. The method includes limiting the vehicle to the maximum vehicle speed upon the at least one of the vehicle speed and the engine speed being less than or equal to a threshold speed. The method further includes limiting the vehicle to a default maximum vehicle speed upon the at least one of the vehicle speed and the engine speed being greater than the threshold speed.

In yet another exemplary embodiment of the present disclosure, a recreational vehicle is provided including a chassis, a ground engaging mechanism configured to support the chassis, and an engine supported by the chassis. The engine is configured to drive the ground engaging mechanism. A suspension system is coupled between the chassis and the ground engaging mechanism. The vehicle includes at least one of a speed sensor and a position sensor. The speed sensor is configured to detect a speed of the vehicle, and the position sensor is configured to detect a height of the suspension system. A throttle valve is configured to regulate engine power. An engine control module is configured to control the throttle valve. The engine control module is further configured to detect an airborne state of the vehicle and a grounded state of the vehicle based on at least one of the detected speed of the vehicle and the detected height of the suspension system. The engine control module reduces the speed of the vehicle to a target speed upon detection of the airborne state, and the target speed is based on a speed of the vehicle when the vehicle is in the grounded state.

In still another exemplary embodiment of the present disclosure, an electronic throttle control method is provided for a vehicle. The method includes the step of providing an engine, a ground engaging mechanism driven by the engine, a throttle valve configured to control a torque output of the engine, and an engine control module configured to control the throttle valve. The method further includes observing a speed of the vehicle and detecting an airborne state of the vehicle based on an acceleration rate of the vehicle. The acceleration rate is based on the observed speed of the vehicle. The method further includes reducing the torque output of the engine upon detection of the airborne state of the vehicle to reduce the speed of the vehicle to a target speed, the target speed being substantially the same as a speed of the vehicle observed prior to the detection of the airborne state.

In another exemplary embodiment of the present disclosure, a recreational vehicle is provided including a chassis, a plurality of ground engaging mechanisms configured to support the chassis, and a drive train supported by the chassis. The drive train includes an engine, a transmission, and a final drive. The engine is configured to drive at least one ground engaging mechanism. The drive train includes a first drive configuration wherein the engine drives at least two of the ground engaging mechanisms and a second drive configuration wherein the engine drives at least four of the ground engaging mechanisms. The vehicle further includes at least one sensor configured to detect a parameter of the vehicle and a throttle valve configured to regulate engine power. An engine control module is configured to control the throttle valve. The engine control module is further configured to detect an airborne state of the vehicle based on the detected parameter of the vehicle. The drive train is modulated from the second drive configuration to the first drive configuration upon detection of the airborne state of the vehicle.

In yet another exemplary embodiment of the present disclosure, a recreational vehicle is provided including a chassis, a plurality of ground engaging mechanisms configured to support the chassis, and a drive train supported by the chassis. The drive train includes an engine, a transmission, and a final drive. The engine is configured to drive at least one ground engaging mechanism. The vehicle includes a first sensor configured to detect a parameter of the vehicle and a second sensor configured to detect an inclination angle of the vehicle. The vehicle includes a throttle valve configured to regulate engine power. The vehicle further includes an engine control module configured to control the throttle valve. The engine control module is configured to detect an airborne state of the vehicle based on the detected parameter of the vehicle. The engine control module adjusts the torque of the engine upon detection of the airborne state and upon the detected inclination angle of the vehicle being outside a predetermined range. The adjustment of a torque of the engine is configured to adjust the inclination angle of the vehicle to within the predetermined range.

In still another exemplary embodiment of the present disclosure, a recreational vehicle is provided including a chassis, a ground engaging mechanism configured to support the chassis, and an engine supported by the chassis. A throttle valve is configured to regulate air intake into the engine. An engine control module is configured to control an opening of the throttle valve. An operator input device is in communication with the engine control module. The engine control module is configured to control the opening of the throttle valve based on the operator input device. The vehicle further includes a transmission driven by the engine and including a first gear and a second gear. The engine control module opens the throttle valve at a slower rate in the first gear than in the second gear based on a movement of the operator input device.

In another exemplary embodiment of the present disclosure, a vehicle is provided including a chassis, a ground engaging mechanism configured to support the chassis, and an engine supported by the chassis. A throttle valve is configured to regulate air intake into the engine. An engine control module is configured to control an opening of the throttle valve. An operator input device is in communication with the engine control module. The engine control module is configured to control the opening of the throttle valve based on the operator input device. The vehicle further includes a load detection device configured to detect a load of the vehicle. The engine control module opens the throttle valve at a first rate based on a movement of the operator input device when the detected load is within a predetermined range and at a second rate based on the movement of the operator input device when the detected load is outside the predetermined range. The first rate is faster than the second rate.

In yet another exemplary embodiment of the present disclosure, a recreational vehicle is provided including a chassis, a ground engaging mechanism configured to support the chassis, and an engine supported by the chassis. A throttle valve is configured to regulate air intake into the engine, and the engine generates a torque based on an opening of the throttle valve. An engine control module is configured to control the throttle valve. An operator input device is in communication with the engine control module. The engine control module is configured to control the opening of the throttle valve based on a position of the operator input device. The vehicle further includes a transmission driven by the engine and including a first gear and a second gear. The engine control module automatically reduces the torque of the engine during a shift of the transmission between the first gear and the second gear.

In still another exemplary embodiment of the present disclosure, a recreational vehicle is provided including a chassis, a plurality of traction devices configured to support the chassis, and a drive train supported by the chassis. The drive train includes an engine, a transmission, and a final drive. The engine is configured to drive at least a portion of the plurality of traction devices. The drive train includes a first drive configuration wherein the engine drives at least two of the traction devices and a second drive configuration wherein the engine drives at least four of the traction devices. The vehicle further includes a throttle valve configured to regulate engine power and an engine control module configured to control the throttle valve. An operator input device is in communication with the engine control module, and the engine control module is configured to control the throttle valve based on a position of the operator input device. The engine control module automatically reduces a torque of the engine during a modulation of the drive train between the first drive configuration and the second drive configuration.

In another exemplary embodiment of the present disclosure, a recreational vehicle is provided including a chassis, a ground engaging mechanism configured to support the chassis, and an engine supported by the chassis. A throttle valve is configured to regulate air intake into the engine, and the engine generates a torque based on an opening of the throttle valve. An engine control module is configured to control the throttle valve. An operator input device is in communication with the engine control module. The engine control module is configured to control the opening of the throttle valve based on a position of the operator input device. The vehicle further includes an altitude sensor in communication with the engine control module. The altitude sensor is configured to detect an altitude of the vehicle. The engine control module limits the opening of the throttle valve to a first maximum opening upon the vehicle being positioned at a first altitude and to a second maximum opening upon the vehicle being positioned at a second altitude higher than the first altitude. The first maximum opening is different from the second maximum opening.

In yet another exemplary embodiment of the present disclosure, a recreational vehicle is provided including a chassis, a ground engaging mechanism configured to support the chassis, and an engine supported by the chassis. A throttle valve is configured to regulate air intake into the engine, and the engine generates power based on an opening of the throttle valve. An engine control module is configured to control the throttle valve. An operator input device is in communication with the engine control module. The engine control module is configured to control the opening of the throttle valve based on a position of the operator input device. The vehicle further includes a continuously variable transmission coupled to the engine. The engine is configured to apply a torque to the continuously variable transmission. The engine control module monitors the torque applied to the continuously variable transmission based on at least one of the position of the operator input device and the opening of the throttle valve. The engine control module limits the torque applied to the continuously variable transmission to within a predetermined torque range.

In still another exemplary embodiment of the present disclosure, a recreational vehicle is provided including a chassis, a ground engaging mechanism configured to support the chassis, and a drive train supported by the chassis. The drive train includes an engine, a transmission, and a final drive. The vehicle includes a throttle valve configured to regulate engine power and a throttle input device configured to adjust the throttle valve. An engine control module is in communication with the throttle input device and the throttle valve. The engine control module automatically controls the throttle valve to provide a torque to the drive train during an idle condition of the engine.

In another exemplary embodiment of the present disclosure, a recreational vehicle is provided including a chassis, a ground engaging mechanism configured to support the chassis, and an engine supported by the chassis. The vehicle includes a speed sensor configured to detect a speed of the vehicle and a safety device configured to support the operator. The safety device is adjustable between an engaged position and a disengaged position. The vehicle includes a throttle valve configured to regulate engine power and a throttle input device configured to control the throttle valve. The vehicle further includes an engine control module in communication with the throttle valve, the safety device, and the speed sensor. The engine control module automatically reduces a torque of the engine upon detection of the safety device being in the disengaged position and upon the detected speed of the vehicle being outside a predetermined range.

BRIEF DESCRIPTION OF THE DRAWINGS

FIG. 6A is a graph illustrating a throttle plate position versus a throttle control position in an exemplary normal drive mode;

FIG. 6B is a graph illustrating a throttle plate position versus a throttle control position in an exemplary plow drive mode;

FIG. 6C is a graph illustrating a throttle plate position versus a throttle control position in an exemplary work drive mode;

FIG. 6D is a graph illustrating a throttle plate position versus a throttle control position in an exemplary sport drive mode;

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

Figure 1:
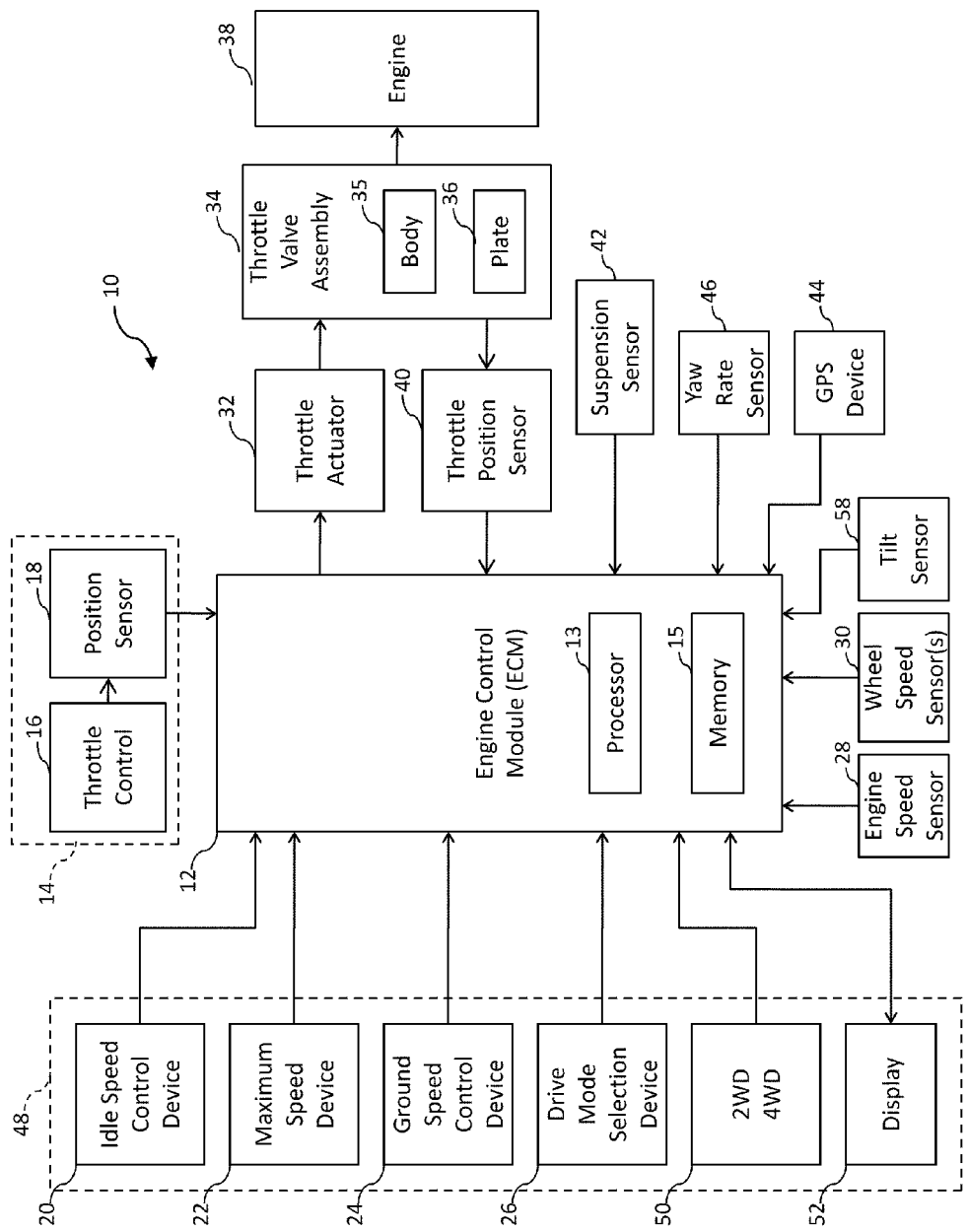
FIG. 1 is a block diagram illustrating an exemplary electronic throttle control system according to one embodiment.
Figure 2:
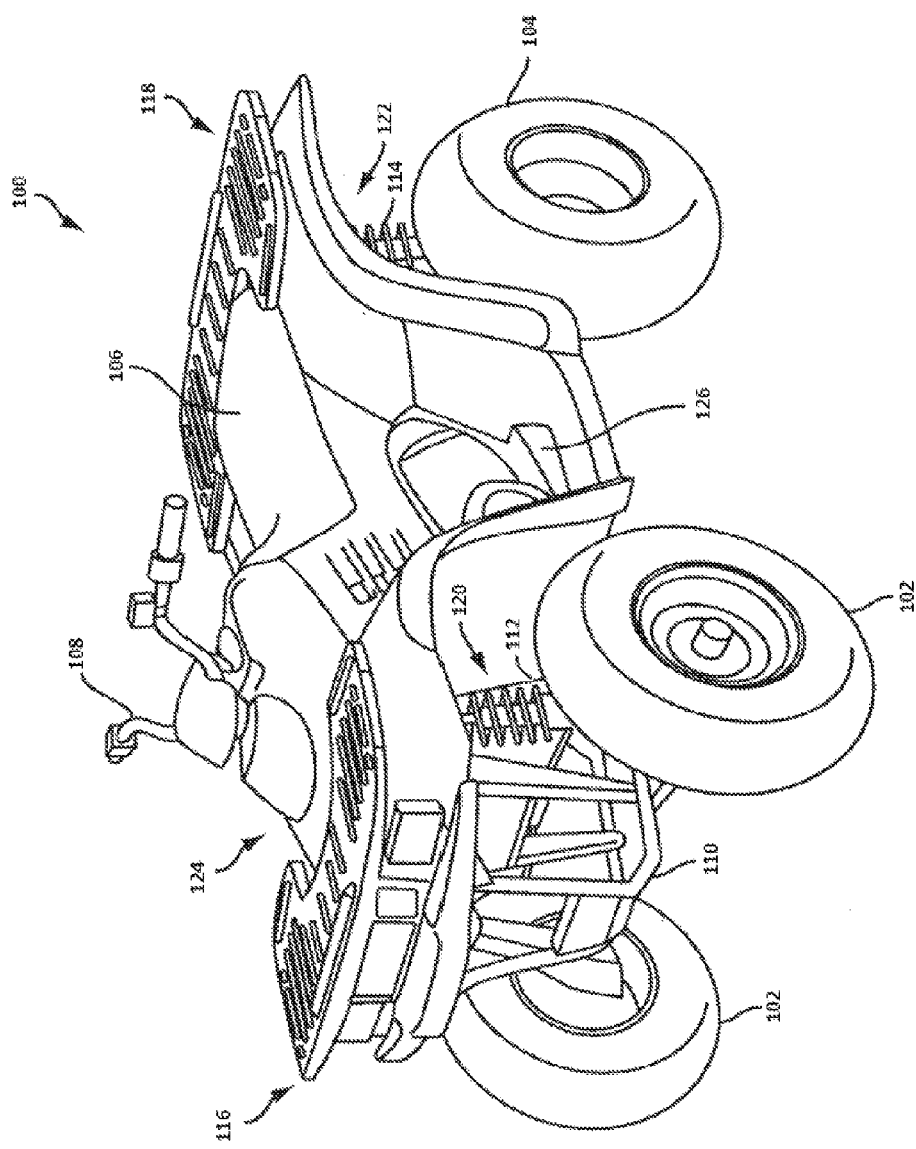
FIG. 2 is a perspective view illustrating an exemplary vehicle incorporating the electronic throttle control system of FIG. 1.

Referring initially to FIG. 1, an exemplary electronic throttle control (ETC) system 10 is illustrated for controlling an engine 38 of a recreational vehicle. ETC system 10 includes an engine control module (ECM) 12 in communication with various input devices and sensors for controlling the operation of engine 38. ETC system 10 may be used to control the engine of any on- or off-road recreational vehicle, such as an ATV, a motorcycle, a utility vehicle, a side-by-side vehicle, a watercraft, and a tracked vehicle, for example. ETC system 10 may also be used to control the engine of an agricultural vehicle or other work vehicle. An exemplary vehicle 100 that incorporates the ETC system 10 of the present disclosure is illustrated in FIG. 2. Vehicle 100 includes a chassis 110, a front end 116, and a rear end 118. A body portion 124 is supported by the chassis 110. Front wheels 102 and rear wheels 104 support chassis 110, although other suitable ground engaging mechanisms may be provided. A front suspension system 120 includes one or more front shock absorbers 112, and a rear suspension system 122 includes one or more rear shock absorbers 114. Vehicle 100 further includes a straddle-type seat 106 and a handlebar assembly 108 for steering front wheels 102.

Figure 3:
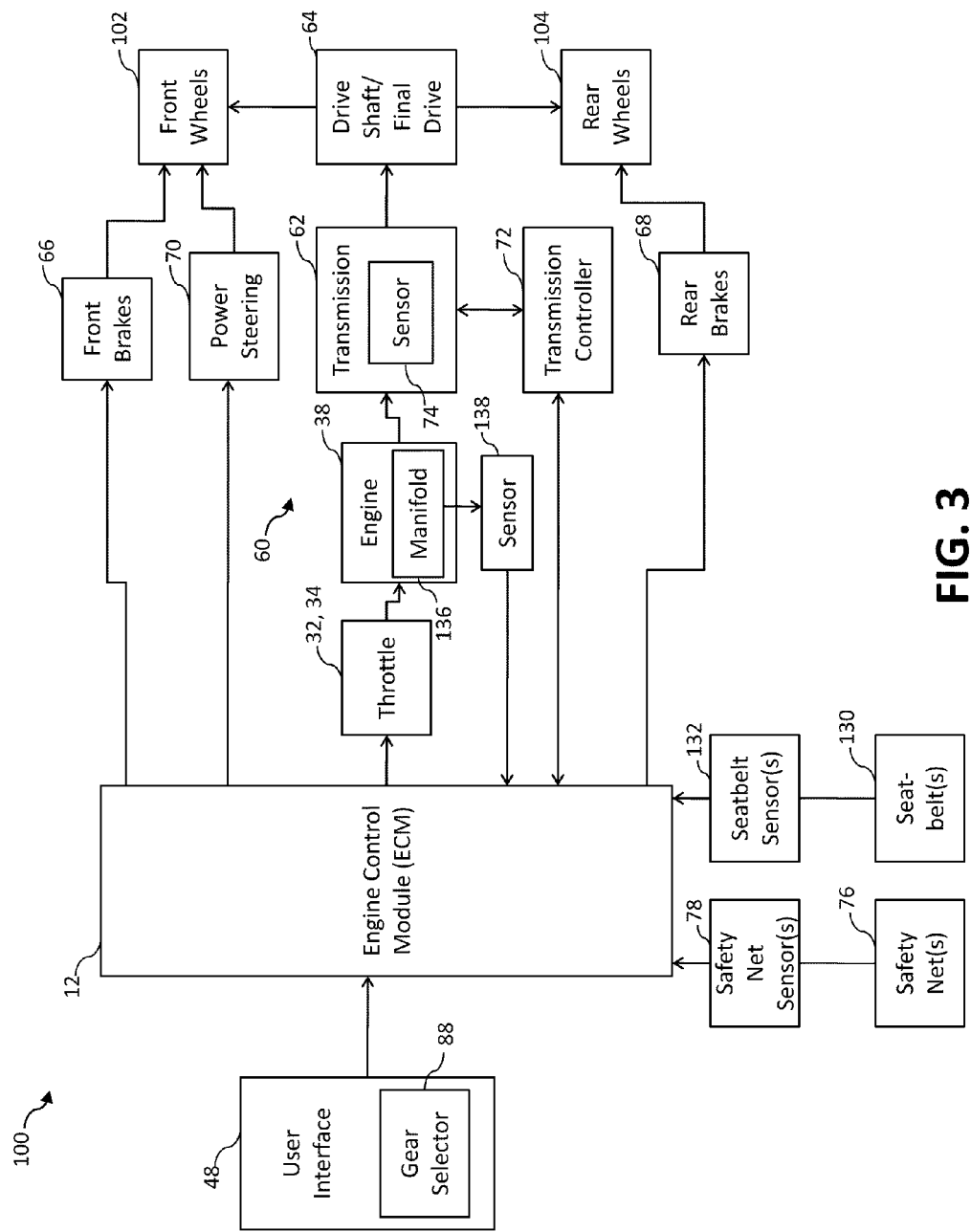
FIG. 3 is a block diagram illustrating the exemplary vehicle of FIG. 2.

As illustrated in FIG. 3, a drive train 60 of vehicle 100 includes engine 38 coupled to a transmission 62. Transmission 62 may be an automatic or a manual transmission 62. In one embodiment, a continuously variable transmission (CVT) 62 is provided. A gear selector 88 is provided at user interface 48 for selecting the transmission gear. In one embodiment, gear selector 88 selects between a low gear, a high gear, and a reverse gear, although additional or fewer transmission gears may be provided.

A pressure sensor 138 in communication with ECM 12 is provided to detect the pressure or suction in a manifold 136 of engine 38. Based on the detected pressure with sensor 138, ECM 12 may determine the torque or power output of engine 38. In particular, ECM 12 calculates the torque output of engine 38 based on the position of throttle control 16 and/or the position of throttle valve 34, the detected engine speed, and the detected manifold pressure in engine 38. Based on these inputs, ECM 12 is configured to calculate the instantaneous torque or power output of engine 38. The amount of fuel injected into or received by engine 38 and the timing of the spark plugs may also contribute to the calculation of engine torque. In one embodiment, the wheel speed measured by wheel speed sensors 30 (FIG. 1) is further considered in determining engine power.

Power supplied from engine 38 is transferred through transmission 62 to a drive shaft and/or final drive 64 and to wheels 102 and/or wheels 104. Vehicle 100 may be a four-wheel drive or a two-wheel drive vehicle, although other wheel configurations may be provided. Brakes 66, 68 are mechanically or hydraulically controlled, and ECM 12 is in communication with the hydraulic/mechanical braking system. In one embodiment, ECM 12 is configured to individually control front brakes 66 and rear brakes 68. For example, ECM 12 includes anti-lock braking (ABS) and traction control (TCS) functionality, as described herein. Vehicle 100 further includes power steering 70 for steering front wheels 102. Exemplary power steering 70 includes a hydraulic system configured to assist with steering wheels 102 upon actuation by an operator. Power steering 70 may alternatively include an electric motor or other suitable system providing steering assist. ECM 12 is illustratively in communication with power steering 70.

Referring again to FIG. 1, ECM 12 is an electronic controller configured to receive and process electrical signals provided by the input devices and sensors of ETC system 10 to control engine 38. ECM 12 includes a processor 13 and a memory 15 accessible by processor 13. Software stored in memory 15 contains instructions for operating ETC system 10. Memory 15 further stores sensor feedback and results from calculations performed by processor 13. In the illustrated embodiment, ETC system 10 is configured to control engine idle speed, control maximum vehicle speed, limit engine power upon the occurrence of a specified event, control vehicle ground speed, protect drivetrain components, provide selectable drive modes, and perform other operations involving throttle control. In the illustrated embodiment, ETC system 10 is configured for use with a fuel-injected engine 38, although other engine types may be provided.

ECM 12 controls movement of a throttle valve assembly 34 based on signals provided to ECM 12 by a throttle input device 14. As illustrated in FIG. 1, throttle valve assembly 34 includes a throttle body 35 and a throttle plate 36. Throttle body 35 may be either a single bore or dual bore type depending on the engine configuration. Adjustment of the throttle plate 36 within throttle body 35 regulates the flow of air into engine 38 to control the speed and power of engine 38 and consequently the speed of the vehicle. In one embodiment, throttle valve assembly 34 is a butterfly valve. A throttle actuator 32 controlled by ECM 12 is coupled to throttle valve assembly 34 for adjusting the position of throttle plate 36 and therefore the air intake into engine 38. In one embodiment, throttle actuator 32 is a servo motor. In the illustrated embodiment, one or more throttle position sensors 40 coupled to throttle plate 36 detect the position of throttle plate 36 and provide a signal representative of the detected position to ECM 12. Alternatively, the servo motor of throttle actuator 32 may provide position feedback to ECM 12. ECM 12 uses the position feedback to control throttle valve assembly 34.

Throttle input device or throttle operator 14 in electrical communication with ECM 12 is used by an operator to control the operation of throttle valve assembly 34. Throttle input device 14 includes a throttle control 16 coupled to or positioned in proximity to a position sensor 18. An exemplary throttle control 16 includes a foot pedal, a twist grip, a thumb or finger lever, or any other suitable device configured to receive input from the operator for adjustment of throttle valve assembly 34. Position sensor 18 detects movement of throttle control 16 and provides a signal representative of the position of throttle control 16 to ECM 12. In response, ECM 12 provides a corresponding throttle plate position command to throttle actuator 32 to cause throttle actuator 32 to adjust the throttle plate position of throttle valve assembly 34 based on the interpreted position of throttle control 16. As such, the speed and torque of engine 38 is controlled electronically based on the output of throttle input device 14 and ECM 12. Position sensor 18 may be a potentiometer or a magnetic sensor, for example. In one embodiment, multiple position sensors 18 are used to detect the position of throttle control 16.

Figure 4:
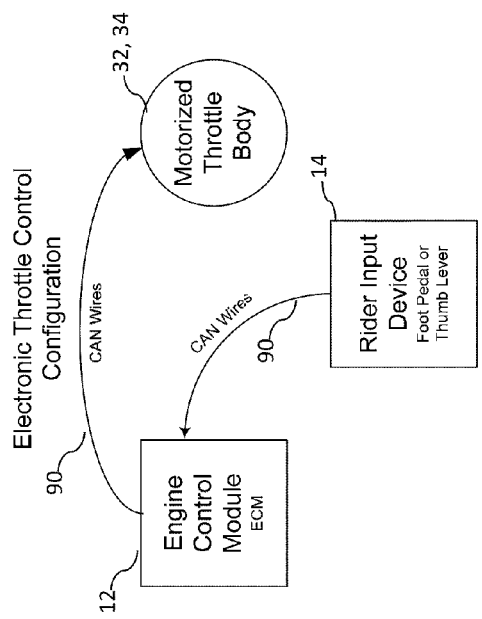
FIG. 4 is a block diagram illustrating an exemplary configuration of the electronic throttle control system of FIG. 1.

ECM 12 communicates with components on ETC system 10, such as throttle actuator 32 and throttle input device 14, using any suitable communication protocol. In one embodiment, controller area network (CAN) protocol is utilized for communication between components on ETC system 10. Other exemplary communication protocols for communication between components of ETC system 10 include time-triggered protocol (TTP) and FlexRay protocol. In the exemplary embodiment of FIG. 4, ETC system 10 includes CAN wires 90 electrically coupling ECM 12 to throttle input device 14 and throttle actuator 32. Other components of ETC system 10, such as idle speed control device 20, maximum speed device 22, ground speed control device 24, and drive mode selection device 26, for example, may also communicate with ECM 12 via CAN wires.

ETC system 10 includes an engine speed sensor 28 and a wheel speed sensor 30 in communication with ECM 12. Engine speed sensor 28 provides a feedback signal to ECM 12 representative of the rotational speed of engine 38. ECM 12 calculates the rotational speed of engine 38 based on feedback provided by engine speed sensor 28. Wheel speed sensor 30 provides a feedback signal to ECM 12 representative of the wheel speed of the recreational vehicle, such as the speed of wheels 102 and/or wheels 104 of vehicle 100 (see FIG. 2), for example. In one embodiment, a wheel speed sensor 30 is coupled to each wheel 102, 104 for measuring individual wheel speeds. ECM 12 calculates the ground speed of the recreational vehicle based on feedback provided by wheel speed sensors 30.

In the illustrated embodiment, a suspension sensor 42 in communication with ECM 12 is configured to measure the height of a component of the vehicle suspension system. For example, sensor 42 is configured to measure the height or compression distance of a shock absorber 112, 114 of vehicle 100 (FIG. 2). In one embodiment, each shock absorber 112, 114 of vehicle 100 includes a corresponding sensor 42 for measuring the shock height or longitudinal compression distance. Alternatively, one of front shocks 112 and one of rear shocks 114 each include a height sensor 42. ECM 12 calculates the shock height based on signals provided with sensor(s) 42. Sensor(s) 42 may be mounted at other suitable locations of the vehicle suspension system 120, 122 for measuring a height or compression of the suspension system 120, 122.

As illustrated in FIG. 1, a user interface 48 is coupled to ECM 12 that provides an operator with selectable inputs for controlling ETC system 10. User interface 48 illustratively includes an idle speed control device 20, a maximum speed device 22, a ground speed control device 24, and a drive mode selection device 26. User interface 48 further includes a selectable input 50 for switching drive train 60 of vehicle 100 (FIG. 2) between a two-wheel drive and a four-wheel or all-wheel drive configuration. A display 52 of user interface 48 provides a visual display of the operation state of vehicle 100, the engine and ground speed, the selected drive mode, the selected drive configuration, and other parameters and measurements of vehicle 100. Display 52 also notifies the operator of when the ground speed control, the maximum speed control, and the idle speed control functionalities have been activated. In one embodiment, the selected vehicle or engine speed associated with each functionality is also displayed. Display 52 may be a monitor, a touch screen, a series of gauges, or any other suitable device for displaying vehicle parameters to an operator. In one embodiment, user interface 48 is a graphical user interface 48 providing inputs 20, 22, 24, 26, and 50 via a touchscreen.

Idle speed control device 20 of user interface 48 is a gauge, switch, button, or other selectable input device that allows an operator to select and to adjust the idle speed of engine 38. Idle speed control device 20 allows an operator to select between a plurality of discrete engine idle speeds. Alternatively, idle speed control device 20 provides a range of selectable engine idle speeds. In one embodiment, idle speed control device 20 displays the selected idle speed and the actual idle speed on display 52. Idle speed control device 20 provides a signal representative of the selected engine idle speed setting to ECM 12. In response, ECM 12 provides a corresponding throttle plate position command to throttle actuator 32 to adjust the throttle plate position of throttle valve assembly 34 based on the engine idle speed setting. In one embodiment, ECM 12 monitors the engine speed feedback from engine speed sensor 28 and adjusts throttle valve assembly 34 accordingly to maintain the engine idle speed at the selected setting.

Maximum speed device 22 allows an operator to set a maximum ground or wheel speed of the recreational vehicle. Maximum speed device 22 is a gauge, switch, button, or other selectable input device that provides a signal representative of the selected maximum ground speed to ECM 12. In response, ECM 12 limits the torque of engine 38 based on the setting of maximum speed device 22 as well as feedback from wheel speed sensor 30 and/or engine speed sensor 28. In the illustrated embodiment of FIG. 9, maximum speed device 22 includes a speed key 80 received in an ignition 82 of vehicle 100. Speed key 80 includes a transmitter 84 containing maximum vehicle speed information. A transceiver 86 located on vehicle 100 is configured to interrogate the speed key 80 to determine the requested maximum speed. Transceiver 86 receives the maximum speed information from transmitter 84. Transceiver 86 then provides a signal to ECM 12 representative of the maximum vehicle speed indicated by the transmitter 84. In one embodiment, transmitter 84 of speed key 80 includes a radio frequency identification (RFID) tag and transceiver 86 includes an RFID reader configured to interrogate the RFID tag. In one embodiment, transceiver 86 interrogates transmitter 84 of speed key 80 upon speed key 80 being received in vehicle ignition 82 and being turned to an ON position. See, for example, the maximum speed control system of U.S. Pat. No. 7,822,514, titled SYSTEM FOR CONTROLLING VEHICLE PARAMETERS, the entire disclosure of which is incorporated herein by reference.

Alternatively, maximum speed device 22 may allow an operator to manually set a maximum vehicle or engine speed of the recreational vehicle. For example, an operator may enter a maximum speed through a keypad or other selectable input of maximum speed device 22. In one embodiment, the operator enters a security code after adjusting the maximum speed to lock out the maximum speed adjustment feature from other operators. In one embodiment, maximum speed device 22 has a default maximum vehicle speed setting that is adjustable by the operator.

In one embodiment, ECM 12 monitors the vehicle ground speed using wheel speed sensor(s) 30. Upon detection of the vehicle ground speed approaching or exceeding the maximum speed provided by maximum speed device 22, ECM 12 provides a throttle command signal to throttle actuator 32 to limit the opening of throttle valve assembly 34, regardless of a greater throttle demand from throttle control 16. As such, ECM 12 controls the engine torque based on feedback from wheel speed sensor 30 to maintain a vehicle ground speed approximately at or below the selected maximum speed, despite throttle control 16 being at a position normally corresponding to a vehicle speed greater than the selected maximum speed.

In one embodiment, maximum speed device 22 provides several modes configured to provide several maximum speed levels. For example, each mode is associated with a skill level of the operator of the vehicle. In a first or beginner mode, the maximum speed is limited to a first predetermined speed. In a second or intermediate mode, the maximum speed is limited to a second predetermined speed greater than the first predetermined speed. In a third or expert mode, the maximum speed is limited to a third predetermined speed greater than the second predetermined speed. Alternatively, the restrictions on the maximum speed may be removed in the third mode, and full motor torque and engine speed is available to the operator. Additional modes having different associated maximum speeds may be provided. In one embodiment, each mode has an associated speed key such that the implemented mode is dictated by the speed key used to turn on the vehicle. Alternatively, the various modes are selected through user interface 48 provided on the vehicle. In one embodiment, the maximum speed in each mode is adjustable by a user. For example, the maximum speed associated with each mode may be programmed into ECM 12 through user interface 48 by a user. In one embodiment, a special code must be entered into ECM 12 to enable modification of the maximum speeds associated with the various modes.

Referring to FIG. 1, ETC system 10 illustratively includes a global positioning system (GPS) device 44 coupled to ECM 12 for tracking the location of vehicle 100 (FIG. 2) and communicating the tracked location to ECM 12. Other suitable satellite navigation systems may be used to track vehicle 100. In one embodiment, ECM 12 limits the speed or torque of vehicle 100 based on the location of vehicle 100 as detected by GPS device 44. For example, ECM 12 implements a maximum ground speed or engine speed upon detection of vehicle 100 being located outside of or within a predefined area. In one embodiment, a user programs one or more boundaries into GPS device 44 and/or ECM 12 to identify an area where vehicle 100 is permitted to operate at full capacity. The user also defines a maximum speed of vehicle 100 for all areas outside the defined boundaries. Upon detection with GPS device 44 of vehicle 100 traveling outside the defined area, ECM 12 limits the speed or torque of the engine 38 to the maximum speed. In one embodiment, ECM 12 reduces the throttle opening to limit the vehicle or engine speed to the maximum speed regardless of throttle operator 14 demanding a faster speed. In one embodiment, ECM 12 limits the maximum ground speed of vehicle 100 to about 5 miles per hour (mph) or less, for example, upon vehicle 100 traveling outside the predetermined bounded area. In another embodiment, ECM 12 limits the maximum speed of vehicle 100 to substantially zero mph upon vehicle 100 traveling outside the predetermined bounded area.

Alternatively, a user may program one or more boundaries into GPS device 44 and/or ECM 12 to define an area where the maximum speed of vehicle 100 is to be limited. Upon detection with GPS device 44 of vehicle 100 traveling within the specified area, ECM 12 limits the speed or torque of vehicle 100 to the maximum speed.

Figure 7:
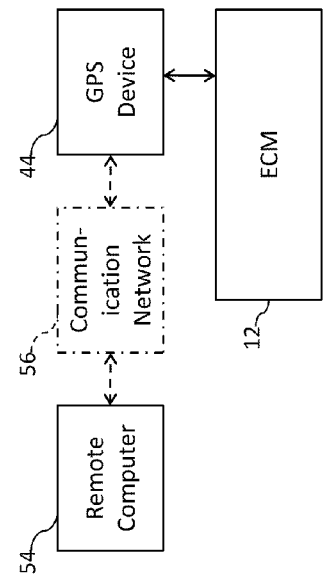
FIG. 7 is a block diagram illustrating an exemplary communication network for the electronic throttle control system of FIG. 1.

In one embodiment, ECM 12 and/or GPS device 44 is in communication with a remote computer via a communication network. Using the remote computer, a user programs the bounded areas into ECM 12 over the communication network. The remote computer is also used to assign maximum speeds for each defined bounded area. See, for example, remote computer 54 and communication network 56 of FIG. 7. Exemplary communication networks 56 include satellite communication (e.g. through GPS device 44), the internet, and/or a physical or wireless connection. Although remote computer 54 is illustratively in communication with GPS device 44 in FIG. 7, remote computer 54 may also communicate directly with ECM 12.

In one embodiment, ECM 12 is programmed to implement location-based maximum speeds for multiple geographical areas. For example, vehicle 100 may be limited to a first maximum speed when traveling in a first area, to a second maximum speed when traveling in a second area, and to a third maximum speed when traveling in a third area. Each area is defined by programming the respective boundaries into the GPS device 44 and/or ECM 12. For example, one portion of a property may have speed restrictions of 5 mph or less, and another portion of the property may have speed restrictions of 20 mph or less. A third portion of the property may have no associated speed restrictions. ECM 12 is programmable to limit vehicle 100 to these speed restrictions based on the detected location of vehicle 100 with GPS device 44. In one embodiment, the location-based maximum speeds for multiple areas are further based on the selected skill-level modes (e.g. beginner, intermediate, expert) described herein. For example, in an intermediate mode, the maximum speeds associated with one or more defined portions of the property may be higher than the maximum speeds in a beginner mode. Similarly, in an expert mode, the maximum speeds associated with one or more defined portions of the property may be higher than the maximum speeds in the intermediate mode.

In one embodiment, ECM 12 includes a security feature configured to limit or to disable operation of vehicle 100 under certain conditions. In one embodiment, a security code programmable into ECM 12 is configured to disable or reduce functionality of vehicle 100. For example, the security code may be entered through user interface 48 to disable operation of engine 38 or to limit the speed of engine 38. Alternatively, a security key or other suitable device may be used to enable a security function that limits or prevents operation of vehicle 100. In one embodiment, the security feature of ECM 12 is incorporated with GPS device 44 to automatically activate the security function based on the location of vehicle 100. In particular, the operation of engine 38 is disabled or limited upon detection with GPS device 44 of vehicle 100 being located outside or within a predefined area. In one embodiment, a security code is first entered into ECM 12 to enable the GPS-based security functionality of ECM 12. An exemplary limited operation of engine 38 includes limiting the maximum speed of vehicle 100 to a minimal speed, such as about 5 mph or less. ECM 12 limits the opening of throttle valve 34 to control the speed of engine 38 and vehicle 100.

For example, in one embodiment, the security feature of ECM 12 is enabled during transportation of vehicle 100 from a manufacturer to a dealer. Once the manufacturing process is complete, vehicle 100 is loaded onto a carrier, such as a freight truck, for transporting vehicle 100 to the dealer. Prior to or upon loading vehicle 100 onto the carrier, the security feature of ECM 12 is enabled to limit or disable operation of engine 38 and/or other devices of vehicle 100. Upon arrival of vehicle 100 at the dealer, the security feature is disabled to restore full functionality to vehicle 100 and engine 38. In one embodiment, the dealer enables the security feature while vehicle 100 remains on the dealer's property, and the security feature is disabled upon a purchaser taking possession of vehicle 100.

In another example, the security feature is utilized by a private owner to reduce the likelihood of theft of vehicle 100. The owner may enable the security feature (e.g. with the security code, security key, etc.) as desired when vehicle 100 is not in use and disable the security feature prior to operating vehicle 100. The owner may also configure ECM 12 to enable the security feature automatically upon vehicle 100 being detected outside a specified property area with GPS device 44, as described herein.

Figure 8A:
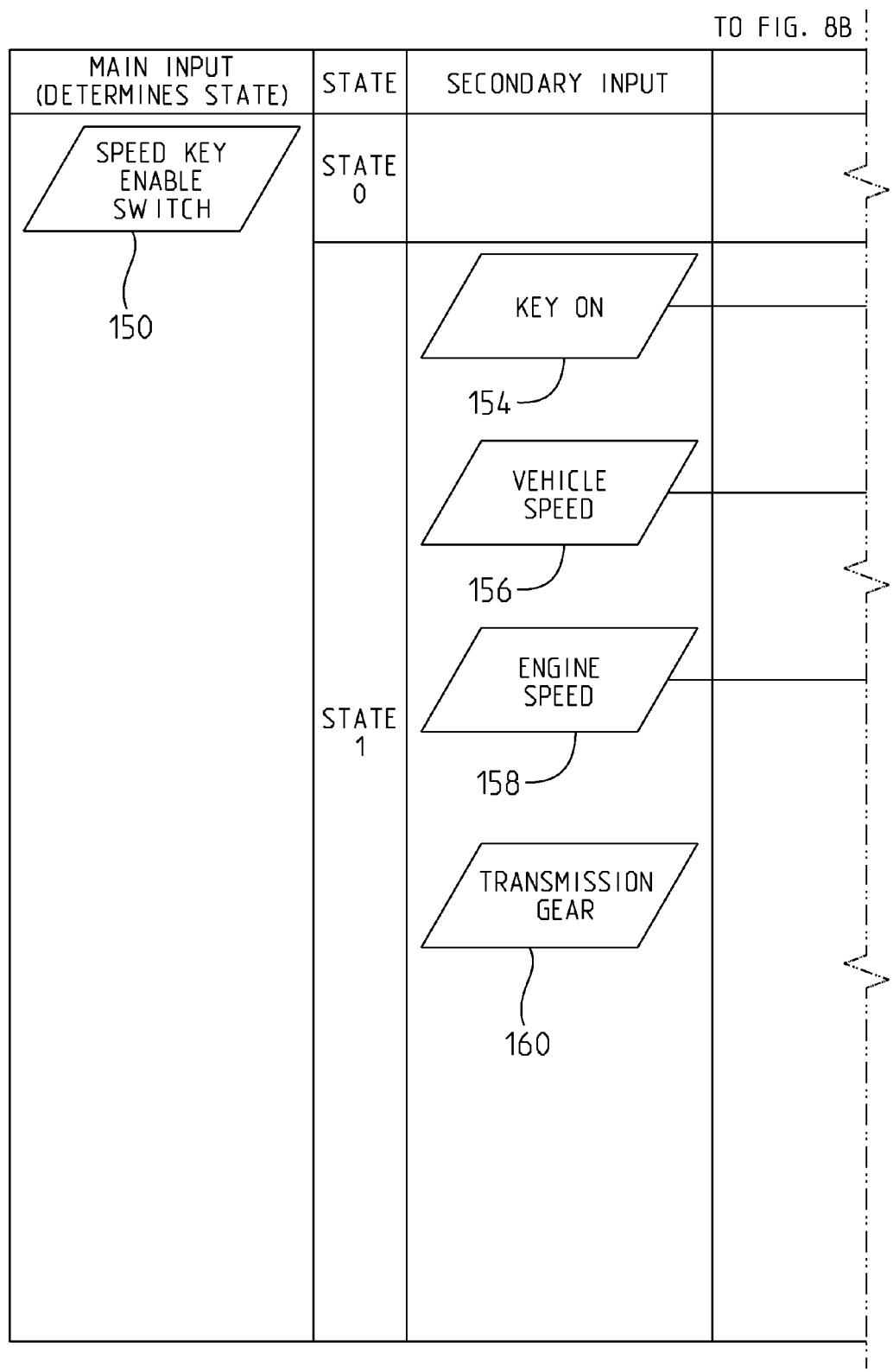
FIGS. 8A-8C are a flow chart illustrating an exemplary method of implementing a maximum vehicle speed.
Figure 8B:
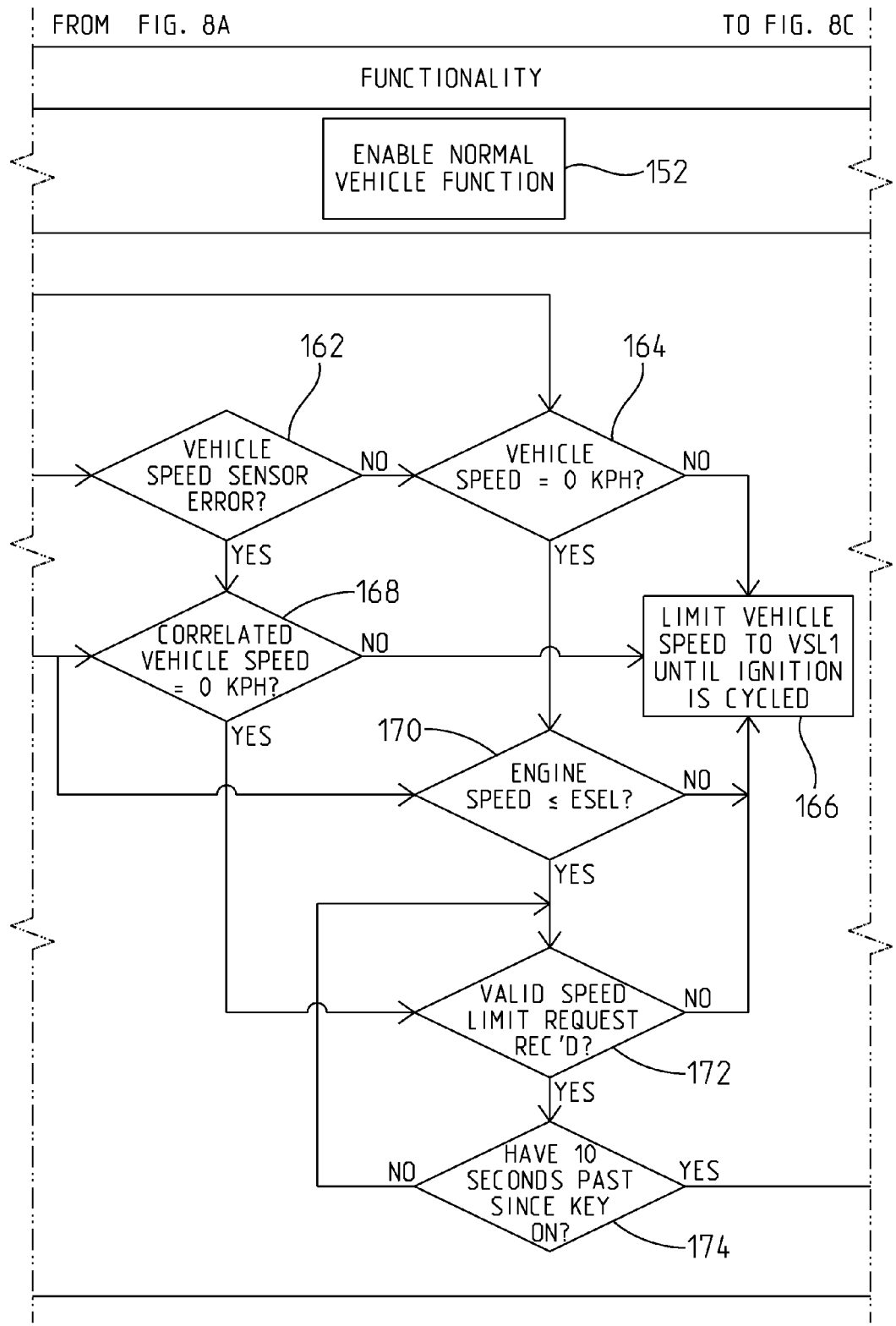
Figure 8C:
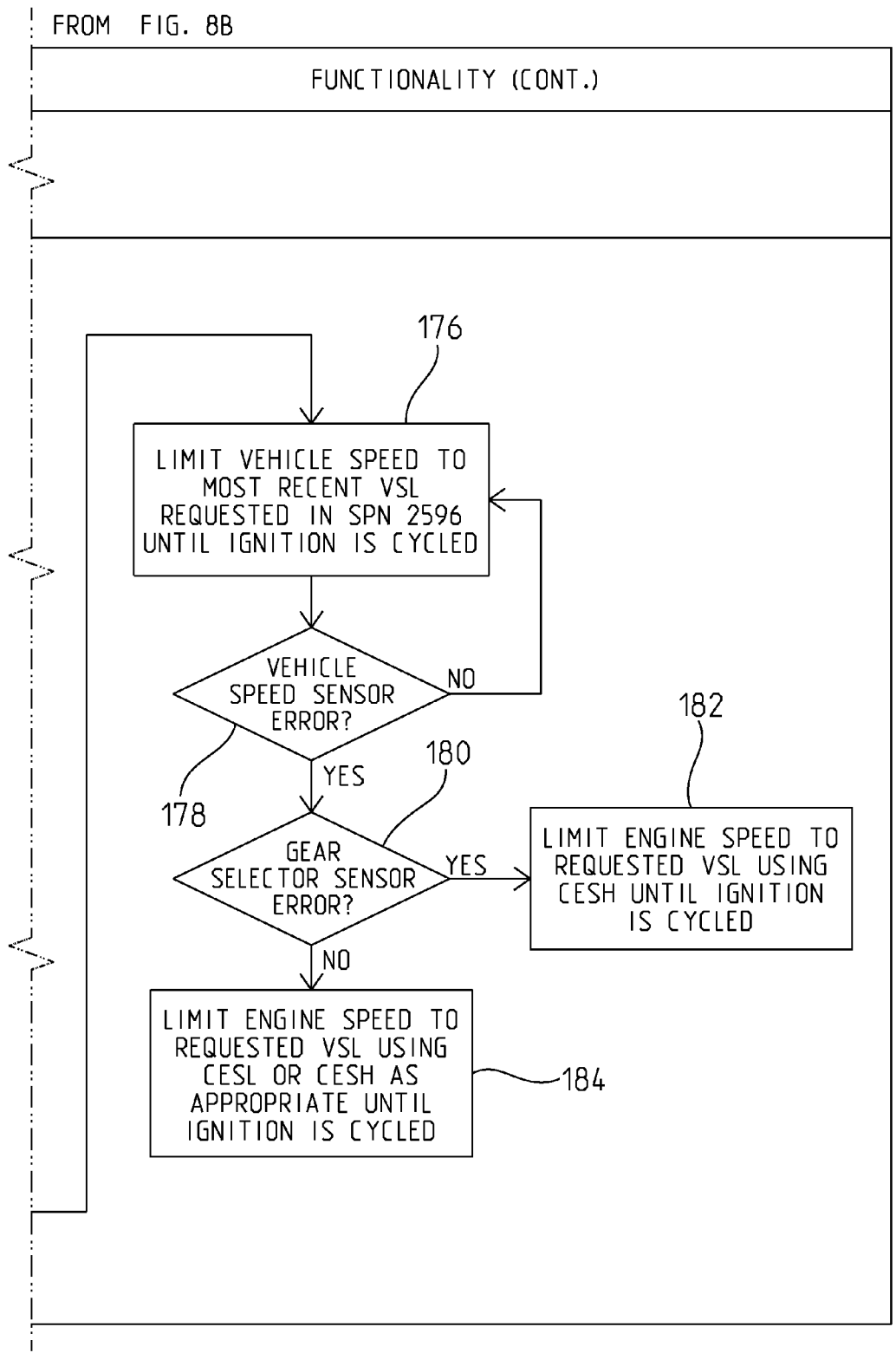

Referring to FIGS. 8A-8C, an exemplary method of limiting the maximum vehicle speed of vehicle 100 is illustrated. In the illustrated embodiment, an object is stored in memory 15 (FIG. 1) of ECM 12 indicating whether the speed key functionality is enabled or disabled in ECM 12. When the speed key functionality is disabled in ECM 12 at block 150, normal vehicle function is implemented at block 152 regardless of any selected maximum speed. When the speed key functionality is enabled in ECM 12 at block 150 and a key is turned ON in the vehicle ignition at block 154, the maximum speed function is implemented by ECM 12. As illustrated at blocks 156 and 158, the vehicle speed and engine speed are monitored by ECM 12 based on feedback from respective sensors 28, 30 (FIG. 1).

At block 162, ECM 12 determines if there is an error or malfunction with speed sensor 30 (FIG. 1). If there is no speed feedback error detected at block 162 and speed key 80 is ON at block 154, ECM 12 monitors the vehicle speed at block 164. If the vehicle speed is not equal to about zero kilometers per hour (KPH) at block 164 (i.e., if vehicle 100 is not substantially stopped), ECM 12 limits the vehicle speed to a first maximum vehicle speed VSL1 until the ignition is cycled, as represented at block 166. In one embodiment, the vehicle ignition (e.g. ignition 82 of FIG. 9) is cycled by turning the ignition key to the OFF position to shut down vehicle 100 and returning the key to the ON position. If there is a vehicle speed error detected at block 162, ECM 12 determines the vehicle speed that corresponds to the currently detected engine speed at block 168. If the correlated vehicle speed is not zero KPH at block 168, ECM 12 proceeds to block 166 to limit the vehicle speed to the first maximum vehicle speed VSL1 until ignition 82 is cycled. In one embodiment, the first maximum vehicle speed VSL1 is the default maximum vehicle speed stored in memory 15 of ECM 12. For example, as described herein, ECM 12 may have a default maximum vehicle speed VSL1 and a plurality of selectable maximum vehicle speeds that are different from the default maximum speed VSL1. In one embodiment, the default maximum speed VSL1 is the lowest maximum speed limit stored in ECM 12. Once the vehicle ignition is cycled, the implemented default maximum vehicle speed VSL1 is disabled, and the process of FIGS. 8A-8C repeats when the key is again turned to the ON position.

If the detected vehicle speed at block 164 is about zero KPH, ECM 12 checks the engine speed via engine speed sensor 28 (FIG. 1). If the detected engine speed is greater than a threshold engine speed ESEL, ECM 12 limits the vehicle speed at block 166 to the first or default maximum vehicle speed VSL1 until the vehicle ignition is cycled. In one embodiment, the threshold engine speed ESEL is approximately equal to the engine idle speed. Other suitable threshold engine speeds ESEL may be used. If the detected engine speed is less than or equal to the threshold engine speed ESEL at block 170, ECM 12 proceeds to block 172 to determine if a valid speed limit request has been received. In the illustrated embodiment, the speed limit request is sent to ECM 12 through a user input at user interface 48, as described herein, or based on the speed key 80 (FIG. 9) inserted in ignition 82. In one embodiment, speed key 80 of FIG. 9 includes an RFID transponder 84 configured to provide the maximum speed request to transceiver/RFID reader 86 mounted on vehicle 100, as described herein. Speed key 80 may provide the maximum speed information directly to transceiver 86 or may provide an identifier that ECM 12 uses to look up the associated maximum speed information in memory 15 (FIG. 1).

In one embodiment, when an operator selects the maximum speed through user interface 48, the maximum speed must be selected within a predetermined amount of time after turning the ignition key to the ON position in order for the selected maximum speed to be accepted and implemented by ECM 12, as described herein.

If a maximum speed is not requested at block 172, ECM 12 implements the the default maximum speed VSL1 (block 166). If a selected maximum speed is received by ECM 12 at block 172, ECM 12 holds the process flow until a predetermined time delay has expired, as illustrated at block 174. As such, the maximum vehicle speed may be selected and changed within the allotted time period before ECM 12 proceeds to implement the most recently selected maximum speed at block 176. In the illustrated embodiment, the time delay is set to ten seconds, although other suitable time delays may be provided.

Once the time delay expires at block 174, ECM 12 implements the most recently requested maximum vehicle speed limit VSL at block 176. As long as an error with vehicle speed sensor 30 is not detected at block 178, the maximum vehicle speed VSL remains in effect until the vehicle ignition is cycled, as illustrated at block 176. Once ignition 82 is cycled, the selected maximum vehicle speed VSL is disabled, and the process of FIGS. 8A-8C repeats when the ignition key is again turned to the ON position in the vehicle ignition.

If an error with vehicle speed sensor 30 is detected at block 178, ECM 12 determines if the gear selector is malfunctioning at block 180 based on transmission gear input 160. See, for example, gear selector 88 of user interface 48 illustrated in FIG. 3. If an error is not detected with gear selector 88 at block 180, ECM 12 limits the engine speed based on the requested maximum vehicle speed VSL, as represented at block 184. In particular, ECM 12 determines an engine speed that corresponds to the selected maximum vehicle speed VSL and limits engine 38 to that determined engine speed. In the illustrated embodiment, ECM 12 determines an engine speed that corresponds to the selected maximum vehicle speed VSL in both the low gear (engine speed CESL) and the high gear (engine speed CESH). If transmission 62 is in the low gear based on transmission gear input 160, maximum engine speed CESL is implemented at block 184. If transmission 62 is in the high gear based on transmission gear input 160, maximum engine speed CESH is implemented at block 184. If an error is detected with gear selector 88 at block 180, ECM 12 limits the engine speed to the high gear maximum engine speed CESH at block 182. The maximum engine speed CESL or CESH implemented in blocks 182, 184 remain in effect until the vehicle ignition is cycled, as described herein.

Figure 9:
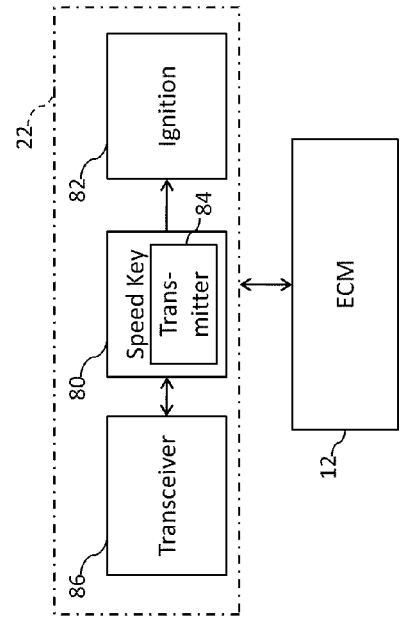
FIG. 9 is a block diagram illustrating an exemplary maximum speed device of the electronic throttle control system of FIG. 1.

In one embodiment, the method of FIGS. 8A-8C is used in conjunction with a speed key, such as speed key 80 of FIG. 9. In particular, each speed key 80 has a different associated maximum speed limit that is received by ECM 12 at block 172. Alternatively, an operator may select a maximum speed using a gauge, switch, touchscreen, or other input device at user interface 48 (FIG. 1). In one embodiment, a plurality of discrete maximum speeds are selectable by an operator. In another embodiment, any number of maximum speeds may be selected over a vehicle speed range. For example, any speed between 0 KPH and 85 KPH may be selected as the maximum speed.

Referring again to FIG. 1, ground speed control device 24 of user interface 48 provides for the selection of a vehicle ground speed to be maintained by ECM 12. Ground speed control may be used to maintain vehicle speed while pulling implements such as sprayers, graders, groomers, seeders, tillers, mowers, etc. or while driving for extended periods on roads or trails, for example. Ground speed control device 24 is a gauge, switch, button, or other selectable input device and provides a signal representative of the selected vehicle ground speed to ECM 12. For example, upon reaching a desired vehicle speed, ground speed control device 24 is actuated or selected by an operator to maintain that desired vehicle speed. In the illustrated embodiment, ECM 12 maintains the vehicle speed indicated by ground speed control device 24 by maintaining the correct engine torque (i.e., with throttle valve 34) for that vehicle speed. In one embodiment, ECM 12 monitors feedback from engine speed sensor 28 and/or wheel speed sensor 30 and maintains the vehicle speed with throttle valve 34 using basic proportional-integral-derivative (PID) control. Once activated, ground speed control may be cancelled upon actuation of throttle control 16 or the vehicle brake 66, 68 (FIG. 3) or by turning off power to ground speed control device 24.

In one embodiment, ECM 12 is configured to limit the vehicle speed range in which ground speed control may be applied. For example, ECM 12 may allow activation of ground speed control only within vehicle speeds of 5-30 mph, although any suitable speed range may be used. In one embodiment, the speed ranges permitted by ECM 12 may differ for each transmission configuration (i.e. for each operating gear). For example, a high transmission gear (e.g. third or fourth gear) has a higher allowed vehicle speed range than a low transmission gear (e.g. first or second gear). In one embodiment, ground speed control device 24 provides an input allowing an operator to manually set the range of vehicle speeds in which ground speed control may be applied.

In another embodiment, ground speed control device 24 and ECM 12 cooperate to provide a maximum speed cruise control function to ETC system 10. In this embodiment, a maximum vehicle speed is requested by an operator with ground speed control device 24 while vehicle 100 is moving. The maximum vehicle speed is set at the speed of vehicle 100 at the time the request is made. With the maximum vehicle speed set, throttle control 16 is used to control vehicle 100 at any speed less than the maximum vehicle speed. When throttle control 16 demands a vehicle speed greater than the maximum vehicle speed, ECM 12 operates to limit the vehicle speed to the maximum vehicle speed. In one embodiment, ECM 12 limits the vehicle speed by reducing the opening of throttle valve 34. As such, ECM 12 overrides input from throttle control 16 when throttle control 16 demands vehicle speeds greater than the maximum vehicle speed. Vehicle 100 may be slowed to any speed less than the maximum vehicle speed based on reduced input from throttle control 16 without cancelling the maximum vehicle speed setpoint. In one embodiment, the maximum vehicle speed is cancelled upon the ignition of the vehicle being cycled (e.g., upon turning the ignition key to an off position and back to an on position) or upon re-selecting ground speed control device 24. In one embodiment, the maximum vehicle speed setpoint is retained when engine 38 is stalled, and the maximum vehicle speed remains in effect upon restarting the stalled engine 38. ECM 12 sends a message to display 52 to notify the operator that the maximum speed cruise control function has been activated and to display the selected maximum speed.

Figure 5:
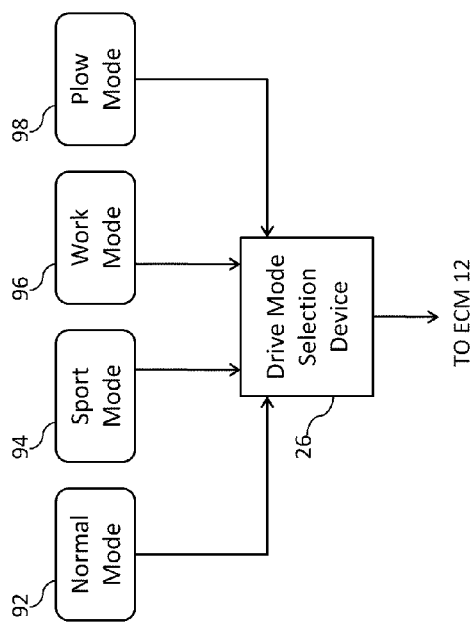
FIG. 5 is a block diagram illustrating an exemplary drive mode selection device of FIG. 1.

Still referring to FIG. 1, drive mode selection device 26 of user interface 48 provides several selectable drive modes. In each drive mode, throttle plate 36 opens within throttle valve assembly 34 at a different rate in response to corresponding movement of throttle control 16. As such, in each drive mode, vehicle 100 has variable acceleration rates or torque output across the displacement range of throttle control 16. Drive mode selection device 26 may be a gauge, switch, button, or other selectable input device configured to provide a signal to ECM 12 indicating the selected drive mode. In the illustrative embodiment of FIG. 5, four drive modes are provided—normal mode 92, sport mode 94, work mode 96, and plow mode 98. In one embodiment, a drive mode is only selectable when vehicle 100 is moving below a predetermined vehicle speed, such as below 10 mph, for example. Other suitable threshold speeds may be provided below which the drive modes may be activated.

FIGS. 6A-6D illustrate exemplary throttle responses or throttle maps for each drive mode. As illustrated in FIGS. 6A-6D, throttle control 16 (shown as "rider input device") has a range of movement from position A (fully released) to position B (fully engaged), and throttle plate 36 has a range of movement from position X (fully closed throttle) to position Y (fully open throttle). Depending on the design of throttle control 16, the movement of throttle control 16 may be rotational, along an arc, along a length, or any other appropriate displacement. For example, a hand grip moves rotationally, while a throttle lever moves along an arc. In the illustrated embodiment, throttle valve assembly 34 is a butterfly valve, and throttle plate 36 moves rotationally within a bore of throttle body 35.

In the normal mode 92 of throttle operation, throttle plate 36 moves linearly with corresponding movement of throttle control 16. In particular, throttle valve assembly 34 opens at a substantially linear rate in response to corresponding movement of throttle control 16. As illustrated in the exemplary throttle response of FIG. 6A, throttle plate 36 moves linearly from position X to position Y as throttle control 16 moves from position A to position B. In other words, the displacement of throttle plate 36 from position X to position Y is substantially linear to the displacement of throttle control 16 from position A to position B.

In the sport mode 94 of throttle operation, throttle plate 36 moves at a faster rate than the rate of corresponding movement of throttle control 16 such that throttle plate 36 reaches a fully or substantially fully open position before throttle control 16 reaches its end of travel. In particular, throttle valve assembly 34 opens at a fast rate initially in response to initial movement of throttle control 16, as illustrated in FIG. 6D. Movement of throttle control 16 from position A to position C, which is illustratively about half the full range of movement of throttle control 16, causes corresponding movement of throttle plate 36 from position X to position Y. In the illustrated embodiment, throttle plate 36 moves from position X to position Y at a substantially logarithmic rate in response to movement of throttle control 16 from position A to position C. Position C may alternatively be at another suitable distance between position A and position B to increase or decrease the displacement of throttle plate 36 in response to a movement of throttle control 16. In the illustrated embodiment, throttle valve 34 is more responsive to corresponding movement of throttle control 16 in the sport mode 94 as compared to the normal mode 92.

In the work mode 96 of throttle operation, throttle plate 36 initially moves at a slower rate than the rate of corresponding movement of throttle control 16. As illustrated in FIG. 6C, throttle valve assembly 34 opens slowly in response to movement of throttle control 16 from position A to position D, opens rapidly in response to movement of throttle control 16 from position D to position E, and opens slowly in response to movement of throttle control 16 from position E to position B. In the illustrated embodiment, position D is at approximately 40% of the full displacement range of throttle control 16, and position E is at approximately 60% of the full displacement range of throttle control 16. Positions D and E may alternatively be at other suitable distances between position A and position B. Put another way, throttle plate 36 moves at a substantially exponential rate in response to movement of throttle control 16 from position A to position C and at a substantially logarithmic rate in response to movement of throttle control 16 from position C to position B. Work mode 96 reduces the sensitivity of throttle valve assembly 34 to initial movements of throttle control 16 while providing the most torque in the middle of the range of movement of throttle control 16. Further, work mode 96 reduces the sensitivity of throttle valve assembly 34 to movements of throttle control 16 near the end of the displacement range of throttle control 16 (e.g. from position E to position B). Work mode 96 may be used during towing or hauling applications, for example.

In the plow mode 98 of throttle operation, throttle plate 36 initially moves at a faster rate than the rate of corresponding movement of throttle control 16. As illustrated in FIG. 6B, throttle valve assembly 34 opens rapidly in response to movement of throttle control 16 from position A to position F, opens slowly in response to movement of throttle control 16 from position F to position G, and opens rapidly in response to movement of throttle control 16 from position G to position B. In the illustrated embodiment, position F is at approximately 25% of the full displacement range of throttle control 16, and position G is at approximately 75% of the full displacement range of throttle control 16. Positions F and G may alternatively be at other suitable distances between position A and position B. Put another way, throttle plate 36 moves at a substantially logarithmic rate in response to movement of throttle control 16 from position A to position C and at a substantially exponential rate in response to movement of throttle control 16 from position C to position B. Plow mode 98 provides increased torque towards the end of the range of movement of throttle control 16 (e.g. from position G to position B). Similarly, plow mode 98 provides decreased torque in the middle of the range of movement of throttle control 16 (e.g. from position F to position G). Plow mode 98 may be used during plowing applications, for example.

In the illustrated embodiment, the normal drive mode 92 is the default drive mode. Upon the selected drive mode being cancelled, ECM 12 defaults to the normal drive mode 92. In one embodiment, the selected drive mode is cancelled upon the ignition of the vehicle being cycled (e.g., upon turning the ignition key to an off position) or upon disabling the mode with drive mode selection device 26. In one embodiment, the selected drive mode is retained when engine 38 is stalled, and the selected drive mode remains in effect upon restarting the stalled engine 38. ECM 12 sends a message to display 52 to notify the operator of the currently selected drive mode.

In one embodiment, each transmission gear of vehicle 100 includes a different set of drive modes. For example, in a transmission 62 with a high gear, a low gear, and a reverse gear, each of these transmission gears has a unique set of drive modes. The low gear has a first normal mode 92, a first sport mode 94, a first work mode 96, and a first plow mode 98, the high gear has a second normal mode 92, a second sport mode 94, a second work mode 96, and a second plow mode 98, and the reverse gear has a third normal mode 92, a third sport mode 94, a third work mode 96, and a third plow mode 98. Each of the normal, work, sport, and plow modes for each transmission gear provides variable movement of the throttle valve 34 in response to corresponding movement of the throttle control 16. In other words, the exemplary throttle maps illustrated in FIGS. 6A-6D differ for each transmission gear while maintaining similar general plot shapes or contours in each common drive mode. For example, the normal mode 92 for low gear and high gear each have linear throttle maps (see FIG. 6A), but throttle valve 34 opens at a slower linear rate in the low gear than in the high gear based on a movement of throttle control 16 when in the normal mode 92. Similarly, the sport mode 94 for low gear and high gear each have substantially logarithmic throttle maps (see FIG. 6D), but throttle valve 34 opens at a slower logarithmic rate in the low gear than in the high gear based on a movement of throttle control 16 when in the sport mode 94. Similarly, the work mode 96 and plow mode 98 for the low gear and high gear each have similar shaped throttle maps (see FIGS. 6C and 6D), but throttle valve 34 opens at a slower rate in the low gear than in the high gear based on a movement of throttle control 16 for each of the work mode 96 and plow mode 98. In one embodiment, throttle valve 34 opens slower in the reverse gear than in the low gear and in the high gear based on a movement of throttle control 16 in each of the four corresponding drive modes.

When an operator selects a drive mode with drive mode selection device 26, the corresponding drive mode from each set are selected as a group. For example, if work mode 92 is selected by an operator, then the first work mode 92 is implemented when transmission 62 is in the low gear, the second work mode 92 is implemented when transmission 62 is in the high gear, and the third work mode 92 is implemented when transmission 62 is in the reverse gear.

In one embodiment, ECM 12 includes a power limiting feature utilized in the event of engine damage or sensor failure. The power limiting feature limits the power and speed of engine 38 by limiting the degree of the opening of throttle valve assembly 34. In one embodiment, upon detection with ECM 12 of sensor failure or engine damage, the power limiting feature is activated to reduce the likelihood of further damage to engine 38 or vehicle 100. Improper or irregular feedback from engine sensors may indicate engine or sensor damage and cause ECM 12 to register a fault. Detection with sensors of engine overheating, improper camshaft movement/position, or improper oxygen levels in the engine exhaust may indicate damage to engine 38, for example. In one embodiment, the power limiting feature may be disabled by the operator with a switch or other input device at user interface 48.

In one embodiment, ECM 12 includes a drivetrain component protection feature configured to limit wheel speed by reducing engine torque under certain wheel speed and engine speed combinations. For example, when vehicle 100 of FIG. 1 is airborne, the driven wheels 102, 104 of vehicle 100 may accelerate rapidly due to the wheels 102, 104 losing contact with the ground while throttle control 16 is still engaged by the operator. When the wheels 102, 104 again make contact with the ground upon vehicle 100 landing, the wheel speed decelerates abruptly, possibly leading to damaged or stressed components of drive train 60. ECM 12 is configured to limit the wheel speed upon detection of vehicle 100 being airborne such that, when vehicle 100 returns to the ground, the wheel speed is substantially the same as when vehicle 100 initially left the ground. In one embodiment, ECM 12 reduces the engine torque, i.e. reduces the throttle valve 34 opening, upon determining vehicle 100 is airborne to reduce or limit the wheel speed, thereby reducing the likelihood of drive train component stress and damage due to over-accelerating wheels 102, 104.

In one embodiment, ECM 12 determines that vehicle 100 is airborne upon detection of a sudden acceleration in the wheel speed based on ground speed and engine rpm feedback from the respective wheel speed sensor 30 and engine speed sensor 28. Vehicle 100 is determined to be airborne when the acceleration in wheel speed exceeds the design specifications of vehicle 100. For example, vehicle 100 has a maximum wheel acceleration based on available torque from engine 38, frictional force from the ground, the weight of vehicle 100, and other design limits. When the driven wheels 102, 104 accelerate at a faster rate than vehicle 100 is capable under normal operating conditions (i.e., when wheels 102, 104 are in contact with the ground), ECM 12 determines that wheels 102, 104 have lost contact with the ground.

In one embodiment, ECM 12 further considers the engine torque and power, along with the detected wheel speed and engine speed, in detecting an airborne state of vehicle 100. As described herein, the engine torque is determined based on the engine speed, the positions of throttle control 16 and throttle valve 34, and the pressure of engine manifold 136 (FIG. 3). Based on the engine speed and engine torque, the power output of engine 38 is determined. Based on the power output of engine 38, the actual vehicle speed, and the transmission gear, ECM 12 determines whether wheels 102, 104 are accelerating at a faster rate than normally provided with the corresponding position of throttle control 16 and/or throttle valve 34 when wheels 102, 104 are in contact with the ground. Upon the wheel speed acceleration exceeding a predetermined level, ECM 12 detects vehicle 100 is airborne and proceeds to limit the wheel speed.

In another embodiment, ECM 12 determines that vehicle 100 is airborne based on an observed change in height or compression distance of one or more shocks of vehicle 100. For example, referring to vehicle 100 of FIG. 2, one or more sensors 42 (FIG. 1) are configured to measure the height or longitudinal compression of shocks 112, 114, as described herein. With vehicle 100 positioned on the ground, the combined weight of chassis 110, body portion 124, and other components supported by chassis 110 causes shocks 112, 114 to compress to a first height. With either or both front wheels 102 and rear wheels 104 of vehicle 100 airborne, the weight of vehicle 100 is removed from respective suspension systems 120, 122, and shocks 112, 114 decompress or extend to a second unloaded height. At the second height, shocks 112, 114 are in a substantially fully extended state. Based on feedback from sensors 42 (FIG. 1), ECM 12 determines the vehicle 100 is airborne upon shocks 112, 114 extending past the first height or upon shocks 112, 114 substantially extending to the second unloaded height. In one embodiment, the shocks 112, 114 must be extended for a specified amount of time before ECM 12 determines that vehicle 100 is airborne. In one embodiment, ECM 12 uses the detected shock height in conjunction with the detected wheel speed acceleration to determine that vehicle 100 is airborne.

In some operating conditions, either wheels 102 or wheels 104 become airborne while the other of wheels 102, 104 remain in contact with the ground. If the wheels 102 or 104 removed from the ground are driven wheels, ECM 12 limits the speed of the driven wheels in the event the wheel speed exceeds a predetermined threshold. For example, in one embodiment, vehicle 100 has a two-wheel drive configuration where wheels 104 are driven by drive train 60 and wheels 102 are not directly driven by drive train 60. When driven wheels 104 become airborne and non-driven wheels 102 remain in contact with the ground, the possibility exists that the position of throttle control 16 causes wheels 104 to accelerate past the vehicle ground speed (e.g. of wheels 102) while wheels 104 are away from the ground. In this condition, ECM 12 detects wheels 104 being removed from the ground either based on the height of suspension system 122 or the detected wheel speed of wheels 104, 102, as described above. In response to wheels 104 accelerating past a predetermined threshold speed, ECM 12 reduces the speed of wheels 104 to a speed substantially equal to the speed of front wheels 102. Alternatively, ECM 12 may reduce the speed of wheels 104 to another suitable speed, such as the speed of wheels 104 immediately before wheels 104 left the ground.

In an exemplary method of electronic throttle control, ECM 12 determines whether vehicle 100 is in a grounded state with wheels 102, 104 in contact with the ground or an airborne state based on the detected shock position and/or the detected wheel speed, as described herein. Upon detection of vehicle 100 in an airborne state, ECM 12 determines the ground speed of vehicle 100 immediately prior to vehicle 100 leaving the ground or when vehicle 100 leaves the ground. In other words, ECM 12 determines the ground speed of vehicle 100 during the transition of the vehicle 100 from the grounded state to the airborne state. In the illustrated embodiment, ECM 12 samples the ground speed during operation of vehicle 100 and stores the sampled values in memory 15 (FIG. 1). ECM 12 retrieves the ground speed stored in memory 15 that was measured immediately prior to vehicle 100 being airborne. The retrieved ground speed value is set as the target wheel speed. ECM 12 automatically controls throttle valve 34 such that the wheel speed of vehicle 100 is maintained at about the target wheel speed. In particular, when the driven wheels 102, 104 accelerate when vehicle 100 is airborne due to continued throttle application, ECM 12 automatically reduces the opening of throttle valve 34 to reduce the torque applied to driven wheels 102, 104, thereby reducing the wheel speed. As such, driven wheels 102, 104 contact the ground at approximately the same speed as when vehicle 100 left the ground, thereby reducing stress on components of drivetrain 60. In one embodiment, the wheel speed is controlled to within about a 10% range of the target ground speed. In one embodiment, ECM 12 applies a brake to the driven wheels to further reduce the wheel speed while vehicle 100 is airborne.

In another embodiment, ECM 12 changes the drive configuration of vehicle 100 under certain airborne conditions. For example, ECM 12 causes vehicle 100 to change from a four-wheel drive configuration to a two-wheel drive configuration when wheels 102, 104 are detected to be removed from the ground. As such, the non-driven wheels, e.g. wheels 102, are free spinning upon returning to the ground, thereby reducing the likelihood of stress and/or damage to drive train 60 caused by wheels 102 being at a speed different than the vehicle ground speed. This embodiment is used in conjunction with the airborne speed control embodiments described above. For example, along with switching from four-wheel drive to two-wheel drive, ECM 12 slows or increases the speed of driven wheels 104 as necessary such that wheels 104 return to the ground at a speed substantially equal to the ground speed of vehicle 100 prior to vehicle 100 leaving the ground, as described herein.

In one embodiment, ECM 12 is configured to adjust the pitch or angle of an airborne vehicle 100 relative to the ground by modulating the throttle operation. ECM 12 automatically adjusts the pitch of airborne vehicle 100 with throttle modulation to improve the levelness of vehicle 100 as vehicle 100 returns to ground. In other words, ECM 12 serves to improve the ability of wheels 102, 104 of vehicle 100 to contact the ground from an airborne state at substantially the same time. As illustrated in FIG. 1, vehicle 100 includes one or more inclination or tilt sensors 58 configured to measure the tilt or pitch of vehicle 100. Upon detection by ECM 12 of vehicle 100 being airborne, as described above, ECM 12 monitors the inclination or pitch of vehicle 100 relative to the ground based on feedback from sensor 58. Upon the detected inclination of vehicle 100 exceeding a threshold value or being outside a predetermined range, ECM 12 modulates the throttle valve 34 to adjust the speed of the driven wheels, e.g., wheels 104, thereby altering the pitch of vehicle 100 relative to the ground. As such, vehicle 100 returns to the ground in a more level orientation. The modulation of the throttle valve and the corresponding adjustment of the wheel speed is configured to adjust the inclination of the vehicle to an angle falling within the predetermined range. In one embodiment, the predetermined range includes inclination angles between about −10 degrees and about +10 degrees relative to the horizontal, for example.

For example, upon vehicle 100 being airborne, front end 116 of vehicle 100 may move towards the ground such that front wheels 102 are closer to the ground than rear wheels 104. In this condition, front wheels 102 are configured to strike the ground before rear wheels 104, possibly causing instability of the operator and vehicle 100 and/or damage to the vehicle 100. Upon detection of this non-level condition by ECM 12 with sensors 58, ECM 12 automatically increases the opening of throttle valve 34 to increase the speed of rear wheels 104. With wheels 104 accelerating at a faster rate, rear end 118 of vehicle 100 is caused to move down towards the ground. As a result, rear end 118 is brought into better vertical alignment or levelness with front end 116 relative to the ground. As such, when vehicle 100 returns to the ground, wheels 102, 104 contact the ground at substantially the same time, or wheels 102, 104 both contact the ground within a shorter amount of time than without the pitch adjustment by ECM 12.

ECM 12 includes an anti-lock braking system (ABS) configured to provide automatic control of brakes 66, 68 (FIG. 2) of vehicle 100. ABS improves vehicle control by reducing the likelihood of wheels 102, 104 locking up and losing traction with the ground. ECM 12 monitors the wheel speed of each wheel 102, 104 with sensors 30 (FIG. 1) to detect any wheels 102, 104 approaching a locked state. ECM 12 causes brakes 66, 68 to selectively reduce the braking force to the individual wheel(s) 102, 104 that are approaching a locked state. In the illustrated embodiment, ECM 12 also monitors the degree of opening of throttle valve 34 during application of the ABS. In one embodiment, ECM 12 automatically reduces the opening of throttle valve 34 during application of the ABS to reduce the torque being applied to wheels 102, 104 via engine 38. For example, when the ABS is activated, ECM 12 reduces the opening of throttle valve 34 to approximately 10%-25%, regardless of throttle operator 14 demanding a greater throttle opening.

ECM 12 further includes a traction control system (TCS) for reducing the traction loss of driven wheels 102, 104. ECM 12 detects individual wheels 102, 104 slipping based on speed feedback from sensors 30. In particular, when a wheel 102, 104 is spinning a certain degree faster than the other wheels 102, 104, slip is detected at that wheel 102, 104. ECM 12 automatically applies the respective brake 66, 68 to the slipping wheel(s) 102, 104 to slow the wheel speed and to allow the slipping wheel(s) 102, 104 to regain traction. In one embodiment, ECM 12 automatically reduces the opening of throttle valve 34 during application of the TCS to reduce the torque being applied to wheels 102, 104 via engine 38. For example, when the TCS is activated, ECM 12 reduces the opening of throttle valve 34 to approximately 10%-25%, regardless of throttle operator 14 demanding a greater throttle opening. Reduction of the throttle further assists the slipping wheel 102, 104 with regaining traction by reducing torque applied to the slipping wheel 102, 104.

ECM 12 further provides vehicle stability control (VCS) to vehicle 100. VCS incorporates the functionality of the ABS and TCS to improve the stability of vehicle 100 during steering operations. In particular, ECM 12 is configured to reduce oversteer and/or understeer of wheels 102, 104. Further, ECM 12 is configured to minimize skids of vehicle 100 during a steering operation. In the illustrated embodiment of FIG. 1, vehicle 100 includes a yaw rate sensor 46 configured to detect and communicate the angular velocity of vehicle 100 to ECM 12. Upon detection of skidding or understeer/oversteer based on feedback from sensors 30 and 46, ECM 12 selectively applies brakes 66, 68 to individual wheels 102, 104 as appropriate to counter oversteer or understeer. In addition, ECM 12 limits the opening of throttle valve 34 as appropriate to further reduce the slip angle of vehicle 100.

ECM 12 also controls the engine torque of vehicle 100 in conjunction with power steering system 70 of FIG. 3. In particular, ECM 12 instructs power steering system 70 to limit the steering assistance (i.e., tighten up the steering) during periods of high engine torque or increased vehicle speed to reduce the likelihood of over-steering vehicle 100 and causing potential skidding or rollover. In other words, steering assistance from power steering system 70 is reduced when vehicle 100 is accelerating at or above a predetermined rate such that the steering device (e.g. handlebar 108 of FIG. 2) requires a greater force to steer vehicle 100. In one embodiment, the steering assistance from power steering 70 is also reduced when vehicle 100 is traveling above a predetermined vehicle speed. In one embodiment, ECM 12 instructs power steering system 70 to provide less steering assistance based on the calculated torque output of engine 38 and/or the detected vehicle speed exceeding a threshold level. In one embodiment, the steering assistance provided with power steering system 70 is proportional to the vehicle speed and the acceleration rate or engine torque of vehicle 100. In one embodiment, the assistance provided with power steering system 70 is further based on the selected gear or position of transmission 62, i.e., the steering assistance provided by power steering system 70 is reduced as the operating gear of transmission 62 is increased.

In one embodiment, ECM 12 is configured to tailor the throttle response to the selected gear of operation. For example, in one embodiment, transmission 62 includes a low gear and a high gear in the forward direction. ECM 12 limits the throttle response in the low gear such that throttle valve 34 is less responsive to corresponding movement of throttle operator 14 than when transmission 62 is in the high gear. For example, in response to a movement of the throttle operator 14, ECM 12 causes throttle valve 34 to open at a slower rate in the low gear than in the high gear, thereby reducing the acceleration rate of vehicle 100 in the low gear as compared to the high gear. As such, vehicle 100 accelerates at a smoother rate in the low forward gear than in the high forward gear. The throttle response may be tailored to transmissions 62 having additional gears. For example, ECM 12 may cause throttle valve 34 to be more responsive in an intermediate gear than in a low gear and more responsive in a high gear than in the intermediate gear.

In a reverse gear, ECM 12 limits the throttle response such that throttle valve 34 is less responsive to corresponding movement of throttle operator 14 than when in a forward gear. For example, ECM 12 causes throttle valve 34 to open at a slower rate than corresponding movement of throttle operator 14 demands, thereby reducing the acceleration rate of vehicle 100 in the reverse direction. As such, vehicle 100 has less acceleration in the reverse direction than in the forward direction. In another embodiment, throttle valve 34 opens at a substantially similar rate in the reverse direction and in the low gear of the forward direction. In one embodiment, ECM 12 also limits the maximum degree of opening of throttle valve 34 when transmission 62 operates in reverse, thereby placing a cap on the amount of engine torque available in the reverse direction. For example, ECM 12 may limit the maximum degree of opening of throttle valve 34 to about 50% open.

ECM 12 is further configured to reduce the throttle response based on the load being carried, towed, pushed, or otherwise moved by vehicle 100. For example, ECM 12 may detect the load of vehicle 100 based on suspension sensors 42 (FIG. 1) or other suitable weight sensors. Upon the detected load exceeding a predetermined threshold weight or being outside a predetermined weight range, ECM 12 is configured to limit the acceleration rate of vehicle 100 by limiting the rate at which throttle valve 34 opens in response to corresponding movement of throttle operator 14. In one embodiment, the predetermined weight range is between about zero and a threshold weight value. Similarly, ECM 12 is configured to reduce the acceleration rate of vehicle 100 upon detection of vehicle 100 hauling, towing, or pushing an implement, trailer, or other attachment. For example, vehicle 100 includes a sensor coupled to ECM 12 that is configured to detect the presence of an implement attached to chassis 110 (FIG. 2) of vehicle 100 and to provide a signal to ECM 12 indicative of the detected implement. In one embodiment, the sensor includes a limit switch or a proximity switch, for example, positioned near the chassis attachment point (e.g. hitch, front or rear connection bracket, etc.) for the implement. In one embodiment, ECM 12 implements the load-based throttle control when transmission 62 is in any suitable gear. In one embodiment, a selectable input is provided at user interface 48 for activating the load-based throttle control functionality of ECM 12. Alternatively, ECM 12 may automatically activate the load-based throttle control under certain operating conditions, i.e, upon transmission 62 being in reverse and an implement being attached to vehicle 100. In one embodiment, ECM 12 controls throttle valve 34 such that the responsiveness of the throttle is inversely proportional to the weight of the load, i.e., the throttle responsiveness decreases as the weight of the load increases.

In one embodiment, ECM 12 is further configured to limit the throttle when transmission 62 changes operating gears to reduce the engine torque applied to drive train 60. In an automatic transmission 62, a transmission controller, such as transmission controller 72 of FIG. 3, signals to ECM 12 that transmission 62 is changing or is about to change gears. Based on the signal from transmission controller 72, ECM 12 temporarily reduces the opening of throttle valve 34 to reduce the torque output of engine 38 as transmission 62 modulates between gears. The reduced throttle serves to reduce the grinding or clashing of gears of transmission 62, the clutch assembly, and/or other components of drive train 60 during the gear modulation. Once the newly selected transmission gear is engaged, ECM 12 returns the throttle valve 34 to the position corresponding to the throttle operator 14. In one embodiment, ECM 12 resumes normal throttle operation based on a signal from transmission controller 72 that the selected gear is engaged. Alternatively, ECM 12 may resume normal throttle operation upon expiration of a predetermined time delay or based on another suitable trigger.

Similarly, in a manual transmission 62, engagement of a clutch operator by the operator signals to ECM 12 of an impending gear change, and ECM 12 thereby reduces the throttle opening during the gear change. Alternatively, initial actuation of the gear shifter (e.g., foot shifter, hand shifter, switch, etc.) by the operator may signal to ECM 12 to reduce the throttle. As with the automatic transmission 62, ECM 12 resumes normal throttle operation upon the selected gear being engaged. For example, the return of the clutch operator to a home position causes normal throttle operation to resume. In one embodiment, in both the manual and automatic transmissions 62, ECM 12 adjusts throttle valve 34 to reduce the torque output of engine 38 to substantially zero torque or to a minimal positive torque.

In one embodiment, ECM 12 is configured to limit the torque output of engine 38 when drive train 60 switches between a two-wheel drive configuration and a four-wheel or an all-wheel drive configuration, and vice versa. In one embodiment, an operator selects a drive configuration input 50 (FIG. 1) of user interface 48 to change between two-wheel and four-wheel or all-wheel drive configurations. In another embodiment, ECM 12 is configured to automatically switch between drive configurations in certain operating conditions of vehicle 100. For example, ECM 12 may engage all-wheel drive upon detection of slippery road conditions. Upon selection of a new drive configuration by an operator or by ECM 12, ECM 12 reduces the opening of throttle valve 34 to reduce engine torque and maintains the reduced throttle until the selected drive configuration is implemented. Once the selected drive configuration is engaged, the position of throttle valve 34 is returned to the position corresponding to throttle operator 14. In one embodiment, ECM 12 reduces the engine torque during the drive configuration change to between about 5% and 30% of the maximum torque capability of engine 38.

In one embodiment, during implementation of the new drive configuration, ECM 12 further reduces the throttle such that engine 38 or other rotating components of drive train 60 slow to a predetermined speed before the selected drive configuration is implemented. An exemplary engine speed is between about 5% and 30% of the maximum engine speed. In one embodiment, the reduced engine torque and engine rpm during the change between drive configurations serves to reduce the likelihood of damaging the clutch assembly and/or other components of drive train 60 that engage and disengage the four-wheel or all-wheel drive.

In one embodiment, in the four-wheel or all-wheel drive configuration, drive train 60 has torque and speed limits to reduce the likelihood of stress or damage to drive train 60. ECM 12 further limits the torque and speed of drive train 60 when vehicle 100 is in the four-wheel or all-wheel drive configuration by limiting throttle valve 34 to a reduced maximum opening. In one embodiment, ECM 12 reduces the torque of drive train 60 in the four-wheel or all-wheel drive configuration to about 75% of the maximum torque capability of engine 38. As such, the likelihood of the speed and torque of drive train 60 exceeding the design limits is reduced.

In one embodiment, ECM 12 is configured to control the torque or horsepower of engine 38 based on the altitude or elevation of vehicle 100. In the illustrated embodiment, ECM 12 is configured to detect the altitude or the elevation above sea level of vehicle 100 based on the detected pressure in engine manifold 136 with pressure sensor 138. Alternatively, GPS device 44, or another suitable device, may be used to calculate the altitude of vehicle 100. As the altitude of vehicle 100 increases, the density and pressure of the air drawn into engine 38 through throttle valve 34 decreases. In one embodiment, the reduced density of the air drawn into engine 38 causes a reduction in the torque output of engine 38. For example, for an engine 38 rated at 70 horsepower (HP), engine 38 produces a maximum power output of about 70 HP at sea-level. As the altitude of vehicle 100 increases, the maximum power output of engine 38 may decrease due to the reduced air density. At some altitudes, for example, the maximum power output of the 70 HP rated engine 38 may drop to about 60 HP.

In one embodiment, ECM 12 limits the throttle at lower altitudes such that engine 38 produces substantially the same torque or power output across a range of altitudes. For example, for the engine 38 rated at 70 HP, at a first altitude (e.g. at approximately sea level), ECM 12 limits the opening of throttle valve 34 to a first maximum opening such that the maximum power output of engine 38 is approximately 60 HP. For example, ECM 12 may limit the throttle valve 34 to about 90% of fully open to cause a reduction in maximum engine power to about 60 HP. Upon detection of vehicle 100 reaching a second altitude higher than the first altitude, ECM 12 increases the maximum opening of throttle valve 34 to a second maximum opening that is greater than the first maximum opening. The second maximum opening is based on the second altitude such that engine 38 continues to produce a maximum power output of approximately 60 HP due to the reduced air density at the second altitude. For example, upon vehicle 100 reaching the second altitude, ECM 12 increases the maximum opening limit of throttle valve 34 to approximately 95% such that engine 38 continues to produce 60 HP despite the increased altitude. Similarly, upon detection of vehicle 100 exceeding a third altitude higher than the second altitude, ECM 12 increases the maximum opening of throttle valve 34 to a third maximum opening that is greater than the second maximum opening. The third maximum opening is based on the third altitude such that engine 38 continues to produce a maximum power output of approximately 60 HP as a result of the further reduced air density at the third altitude. For example, upon vehicle 100 reaching the third altitude, ECM 12 increases the maximum opening limit of throttle valve 34 to approximately 100% such that engine 38 continues to produce 60 HP despite the increased altitude. Additional altitude thresholds and maximum throttle openings may be incorporated. In one embodiment, the maximum opening of throttle valve 34 is directly proportional to the detected altitude and is based on the estimated air density at the various altitudes.

In one embodiment, transmission 62 is a continuously variable transmission (CVT) 62, and ECM 12 is configured to limit the torque or power applied to CVT 62 to protect the belt or other components of the CVT 62. Further, by limiting power applied to CVT 62, the gap between belt elements of CVT 62 and the resulting belt slip may also be reduced. In this embodiment, ECM 12 is configured to detect the gear ratio of CVT 62 based on feedback from a position sensor (e.g. sensor 74 of FIG. 3) coupled to CVT 62. ECM 12 further determines the output power or torque from engine 38 based on the position of throttle valve 34 and other inputs, as described herein. Based on the detected gear ratio of CVT 62, the detected engine speed and wheel speed with respective sensors 28, 30, and the torque output of engine 38, ECM 12 calculates the amount of power being applied to the belt of CVT 62. ECM 12 limits the power applied to the belt of CVT 62 to a predetermined maximum level by controlling the position of throttle valve 34, as described herein. The predetermined maximum power level varies according to the detected gear ratio of CVT 62. For example, a higher gear ratio of CVT 62 may correspond to a higher maximum power level. In one embodiment, the predetermined maximum power level is set based on the stress or strain design limits of the belt of CVT 62 to reduce the likelihood of CVT 62 being damaged. The predetermined maximum power level may be further based on the design limits of the CVT 62 to reduce the likelihood of belt slip. In another embodiment, ECM 12 maintains the power applied to CVT 62 to within a predetermined power range by controlling throttle valve 34.

In one embodiment, ECM 12 is configured to maintain application of a positive torque on components of drive train 60 during periods of engine idle. For example, ECM 12 adjusts throttle valve 34 to hold the drive train 60 components above a zero-torque level when engine 38 is idling. In one embodiment, ECM 12 maintains the applied torque to drive train 60 at a minimal level such that wheels 102, 104 are not caused to rotate. In particular, the applied torque to drive train 60 during the engine idle condition is less than the torque required to rotate driven wheels 102, 104. ECM 12 monitors the torque applied to drive train 60 based on throttle valve 34, engine manifold pressure, engine speed, and other inputs, as described herein. In one embodiment, maintaining at least a minimal torque on the components of drive train 60 serves to reduce the likelihood of the components clashing or colliding when drive train 60 is transitioned from an idle condition to a drive condition. In one embodiment, when engine 38 is idling and drive train 60 components are above a zero-torque level, drive train 60 and wheels 102, 104 are more responsive to initial input from throttle operator 14 due to the reduced "play" in the drive train 60. In one embodiment, the torque applied to drive train 60 during the idle condition is less than or equal to about 1% of the maximum torque capability of engine 38.

In one embodiment, engine 38 generates power while vehicle 100 is stationary to drive hydraulics, a power-take-off (PTO), an inverter, or other mechanical or electrical auxiliary systems. The hydraulics and the PTO may be used to manipulate an attachment or an implement, and the inverter may be used to charge an onboard battery or other energy storage device, for example. In one embodiment, when transmission 62 is in a neutral gear, an operator selects an input at user interface 48 to activate engine 38 for generating power to the auxiliary systems. For example, an operator may select an input to activate the hydraulics, the PTO, or the inverter. ECM 12 controls throttle valve 34 to deliver power from engine 38 to the selected system. In one embodiment, ECM 12 maintains engine 38 at a fixed speed to provide constant power output to the selected system.

In the illustrated embodiment of FIG. 3, vehicle 100 includes a safety net 76 or other suitable platform or device configured to support the operator and to reduce the likelihood of an operator's feet and/or legs slipping past footrests 126 (FIG. 2) of vehicle 100. A safety net sensor or switch 78 is provided at each safety net 76 to detect the attachment of the safety net 76 to vehicle 100. Switches 78 are configured to provide a signal to ECM 12 indicating whether safety nets 76 are properly attached to vehicle 100. In one embodiment, vehicle 100 further includes one or more seatbelts 130 or another suitable safety harness configured to help secure the operator within seat 106 (FIG. 2) of vehicle 100. For example, seatbelt 130 serves to support the operator from movement away from seat 106. A seatbelt sensor or switch 132 is provided for each seatbelt 130 and is configured to provide a signal to ECM 12 indicating whether the corresponding seatbelt 130 is properly engaged or secured. Switches 78 and 132 may include proximity sensors or limit switches, for example. In one embodiment, switches 78 and 132 communicate with ECM 12 via CAN communication.

In one embodiment, ECM 12 implements a driver equipment speed limit based on the proper engagement of safety nets 76 and/or seatbelts 130. When a safety net 76 and/or a seatbelt 130 is not properly attached to vehicle 100 based on feedback from switches 78 and 132, ECM 12 limits or prevents operation of vehicle 100. For example, ECM 12 may implement a reduced maximum speed of vehicle 100 (e.g. 5 mph) upon one of safety nets 76 and/or seatbelts 130 being removed or being improperly attached. The driver equipment speed limit feature of ECM 12 may be disabled by an operator (e.g. by entering a disable code into ECM 12) such that safety nets 76 and seatbelts 130 are not required to be properly engaged for unrestricted operation of vehicle 100. In one embodiment, a passenger sensor is provided to detect when a passenger is present. Upon detection of a passenger, ECM 12 may limit vehicle operation based on the passenger seatbelt 130 and/or safety nets 76 not being properly engaged.

In one embodiment, when vehicle 100 is traveling above a threshold vehicle speed and one of nets 76 and/or seatbelts 130 is disengaged, ECM 12 causes vehicle 100 to slow to a specified vehicle speed at a specified deceleration rate. In one embodiment, the specified deceleration rate, the threshold vehicle speed, and/or the specified vehicle speed are adjustable by the operator through user interface 48. In one embodiment, the threshold vehicle speed and the specified vehicle speed are the same. When the vehicle speed is being limited by ECM 12 and the net 76 and/or seatbelt 130 is re-engaged, ECM 12 removes the speed limit and accelerates the vehicle 100 to the speed commanded by throttle control 16 at a specified acceleration rate. The specified acceleration rate may be adjustable by an operator.

ECM 12 sends a message to display 52 of user interface 48 to notify the operator that the safety net 76 and/or seatbelt 130 is disengaged or improperly attached. In one embodiment, if a sensor fault is detected at sensors 78 or 132, ECM 12 limits the vehicle speed to a predetermined maximum speed until the fault is cleared or corrected. In one embodiment, the predetermined maximum speed is adjustable by an operator through user interface 48.

While a single ECM 12 is illustrated and described in the present disclosure, additional controllers may be provided to perform the disclosed functions and to provide the disclosed features of ETC system 10.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A recreational vehicle including:
a front portion including at least one front ground engaging member;
a rear portion including at least one rear ground engaging member;
a chassis extending between the front portion and the rear portion;
an engine supported by the chassis, the engine being configured to drive at least one of the at least one front ground engaging member and the at least one rear ground engaging member;
a suspension system coupled between the chassis and the at least one of the at least one front ground engaging member and the at least one rear ground engaging member;
at least one of a speed sensor and a position sensor, the speed sensor being configured to detect a speed of the vehicle and the position sensor being configured to detect a height of the suspension system;
a throttle valve configured to regulate engine power; and
an engine control module configured to control the throttle valve, the engine control module being configured to detect an airborne state of the vehicle and a grounded state of the vehicle based on at least one of the detected speed of the vehicle and the detected height of the suspension system, in the airborne state at least one of the front portion and the rear portion being spaced apart from the ground, in the grounded state the front portion and the rear portion being in contact with the ground, the engine control module reducing a ground engaging member speed of the vehicle to a target ground engaging member speed upon detection of the airborne state, the target ground engaging member speed being based on the detected speed of the vehicle during a transition of the vehicle between the grounded state and the airborne state.

2. The vehicle of claim 1, further including an operator input device in communication with the engine control module for controlling the throttle valve, the engine control module controlling the throttle valve based on the operator input device upon the vehicle returning to the grounded state.

3. The vehicle of claim 1, wherein the detected speed of the vehicle is the rotational speed of a ground engaging member of at least one of the at least one front ground engaging member and the at least one rear ground engaging member, the engine control module determining an acceleration rate of the ground engaging member based on the detected rotational speed of the ground engaging member, wherein the airborne state is detected based on the determined acceleration rate exceeding a threshold acceleration rate.

4. The vehicle of claim 1, further including a transmission driven by the engine and having a plurality of selectable gears, the engine control module detecting the airborne state based on a rotational speed of at least one ground engaging member, a torque output of the engine, and the selected gear of the transmission.

5. The vehicle of claim 1, wherein the engine control module detects the airborne state of the vehicle based on the detected height of the suspension system being greater than a threshold height for longer than a threshold duration.

6. The vehicle of claim 1, wherein the at least one front ground engaging member includes two front wheels and the at least one rear ground engaging member includes two rear wheels.

7. A recreational vehicle including:
a chassis;
a plurality of ground engaging mechanisms configured to support the chassis;
a drive train supported by the chassis and including an engine, a transmission, and a final drive, the engine being configured to drive at least one ground engaging mechanism;
a first sensor configured to detect a parameter of the vehicle;
a second sensor configured to detect an inclination angle of the vehicle;
a throttle valve configured to regulate engine power; and
an engine control module configured to control the throttle valve, the engine control module being configured to detect an airborne state of the vehicle based on the detected parameter of the vehicle, the engine control module adjusting the torque of the engine in response to the detection of the airborne state and the detected inclination angle of the vehicle being outside a predetermined range, the adjustment of a torque of the engine being configured to adjust the inclination angle of the vehicle to within the predetermined range.

8. The vehicle of claim 7, wherein the engine control module adjusts the torque of the engine by increasing the opening of the throttle valve to increase a rotational speed of the at least one ground engaging mechanism.

9. The vehicle of claim 7, wherein the drive train includes a first drive configuration wherein the engine drives at least two ground engaging mechanisms and a second drive configuration wherein the engine drives at least four ground engaging mechanisms, the engine control module adjusting the torque of the engine further upon the drive train being in the first drive configuration.

10. The vehicle of claim 7, wherein the first sensor includes a speed sensor configured to detect a rotational speed of the at least one ground engaging mechanism, the engine control module detecting the airborne state based on the detected rotational speed of the at least one ground engaging mechanism.

11. The vehicle of claim 7, wherein the first sensor includes a position sensor configured to detect a height of the suspension system, and the engine control module detects the airborne state based on the detected height of the suspension system being greater than a threshold height.

12. A recreational vehicle including:
a front portion including at least one front ground engaging member;
a rear portion including at least one rear ground engaging member;
a chassis extending between the front portion and the rear portion;
an engine supported by the chassis, the engine being configured to drive at least one of the at least one front ground engaging member and the at least one rear ground engaging member;
a suspension system coupled between the chassis and the at least one of the at least one front ground engaging member and the at least one rear ground engaging member;
at least one of a speed sensor and a position sensor, the speed sensor being configured to detect a speed of the vehicle and the position sensor being configured to detect a height of the suspension system;

a throttle valve configured to regulate engine power;

a transmission driven by the engine and having a plurality of selectable gears, an engine control module configured to control the throttle valve, the engine control module being configured to detect an airborne state of the vehicle and a grounded state of the vehicle based on at least one of the detected speed of the vehicle and the detected height of the suspension system, the engine control module detecting the airborne state based on a rotational speed of at least one ground engaging member, a torque output of the engine, and the selected gear of the transmission, in the airborne state at least one of the front portion and the rear portion being spaced apart from the ground, in the grounded state the front portion and the rear portion being in contact with the ground, the engine control module reducing a ground engaging member speed of the vehicle to a target ground engaging member speed upon detection of the airborne state, the target ground engaging member speed being a ground engaging member speed of the vehicle when the vehicle is in the grounded state prior to the detection of the airborne state.

13. The vehicle of claim 12, further including an operator input device in communication with the engine control module for controlling the throttle valve, the engine control module controlling the throttle valve based on the operator input device upon the vehicle returning to the grounded state.

14. The vehicle of claim 12, wherein the target ground engaging member speed is based on the detected speed of the vehicle during a transition of the vehicle between the grounded state and the airborne state.

15. The vehicle of claim 12, wherein the detected speed of the vehicle is the rotational speed of a ground engaging member of at least one of the at least one front ground engaging member and the at least one rear ground engaging member, the engine control module determining an acceleration rate of the ground engaging member based on the detected rotational speed of the ground engaging member, wherein the airborne state is detected based on the determined acceleration rate exceeding a threshold acceleration rate.

16. The vehicle of claim 12, wherein the engine control module detects the airborne state of the vehicle based on the detected height of the suspension system being greater than a threshold height for longer than a threshold duration.

17. The vehicle of claim 12, wherein the at least one front ground engaging member includes two front wheels and the at least one rear ground engaging member includes two rear wheels.

* * * * *